US008174544B2

(12) United States Patent
Sato et al.

(10) Patent No.: US 8,174,544 B2
(45) Date of Patent: May 8, 2012

(54) IMAGE DISPLAY APPARATUS, IMAGE DISPLAYING METHOD, PLASMA DISPLAY PANEL APPARATUS, PROGRAM, INTEGRATED CIRCUIT, AND RECORDING MEDIUM

(75) Inventors: Daisuke Sato, Osaka (JP); Yusuke Monobe, Kyoto (JP)

(73) Assignee: Panasonic Corporation, Osaka (JP)

( * ) Notice: Subject to any disclaimer, the term of this patent is extended or adjusted under 35 U.S.C. 154(b) by 713 days.

(21) Appl. No.: 12/301,054

(22) PCT Filed: May 23, 2007

(86) PCT No.: PCT/JP2007/060553

§ 371 (c)(1), (2), (4) Date: Nov. 17, 2008

(87) PCT Pub. No.: WO2007/136099

PCT Pub. Date: Nov. 29, 2007

(65) Prior Publication Data

US 2009/0184894 A1 Jul. 23, 2009

(30) Foreign Application Priority Data

May 23, 2006 (JP) ................................ 2006-142490

(51) Int. Cl.

| | |
|---|---|
| ***G09G 5/10*** | (2006.01) |
| ***G09G 5/00*** | (2006.01) |
| ***G09G 3/10*** | (2006.01) |
| ***G06F 3/038*** | (2006.01) |

(52) U.S. Cl. .......................... 345/690; 345/204; 345/37

(58) Field of Classification Search .................... 345/37, 345/60, 204, 89, 690; 348/254, 280, 208.13, 348/671

See application file for complete search history.

(56) References Cited

U.S. PATENT DOCUMENTS

| | | | | |
|---|---|---|---|---|
| 5,872,604 | A * | 2/1999 | Ogura | .......................... 348/699 |
| 6,014,258 | A | 1/2000 | Naka et al. | |
| 6,377,232 | B1 | 4/2002 | Chevet et al. | |

(Continued)

FOREIGN PATENT DOCUMENTS

| | | |
|---|---|---|
| EP | 0 896 317 | 2/1999 |

(Continued)

OTHER PUBLICATIONS

Supplementary European Search Report (in English language) issued Aug. 6, 2010 in corresponding European Patent Application No. 07 74 3987.

(Continued)

*Primary Examiner* — Bipin Shalwala
*Assistant Examiner* — Hang Lin
(74) *Attorney, Agent, or Firm* — Wenderoth, Lind & Ponack, L.L.P.

(57) ABSTRACT

Previously, image display apparatuses using phosphors each having a different persistence time have a problem of reducing a motion blur caused by persistence of the phosphors in an image and improving color shift caused by the motion blur. To overcome this problem, an image display apparatus (1) includes: a motion detecting unit (2) calculating motion information from an inputted image signal, such as a region, a velocity, a direction of a motion, and a matching difference; a correction signal calculating unit (3) calculating a correction signal for correcting the motion blur caused by persistence in the inputted image signal, using the motion information; and a correcting unit (4) correcting the input image signal using the calculated correction signal.

15 Claims, 12 Drawing Sheets

U.S. PATENT DOCUMENTS

| | | | | |
|---|---|---|---|---|
| 6,687,387 | B1 * | 2/2004 | Molnar et al. | 382/107 |
| 2004/0169732 | A1 * | 9/2004 | Weitbruch et al. | 348/208.13 |
| 2004/0183820 | A1 * | 9/2004 | Kawahara et al. | 345/690 |
| 2005/0001935 | A1 * | 1/2005 | Kiuchi et al. | 348/607 |
| 2005/0030302 | A1 * | 2/2005 | Nishi et al. | 345/204 |
| 2006/0192786 | A1 * | 8/2006 | Yamada | 345/589 |
| 2006/0192896 | A1 | 8/2006 | Sawa | |

FOREIGN PATENT DOCUMENTS

| | | | |
|---|---|---|---|
| EP | 0 924 684 | | 6/1999 |
| EP | 1175089 | A2 * | 1/2002 |
| EP | 1 426 915 | | 6/2004 |
| EP | 1 460 611 | | 9/2004 |
| EP | 1 605 689 | | 12/2005 |
| JP | 10-254403 | | 9/1998 |
| JP | 10-282930 | | 10/1998 |
| JP | 11-109916 | | 4/1999 |
| JP | 11-259044 | | 9/1999 |
| JP | 2001-255863 | | 9/2001 |
| JP | 2002-14647 | | 1/2002 |
| JP | 2004-4782 | | 1/2004 |
| JP | 2004-191728 | | 7/2004 |
| JP | 2004-532433 | | 10/2004 |
| JP | 2005-141204 | | 6/2005 |
| JP | 2005-351949 | | 12/2005 |

OTHER PUBLICATIONS

International Search Report issued Aug. 7, 2007 in the International (PCT) Application of which the present application is the U.S. National Stage.

* cited by examiner

IMAGE DISPLAY APPARATUS, IMAGE DISPLAYING METHOD, PLASMA DISPLAY PANEL APPARATUS, PROGRAM, INTEGRATED CIRCUIT, AND RECORDING MEDIUM

TECHNICAL FIELD

The present invention relates to an image display apparatus that displays an image using phosphors each having a persistence time and to an image displaying method of the same.

BACKGROUND ART

Image display apparatuses such as a plasma display panel (hereinafter referred to as PDP) use phosphors of 3 colors (red, green, and blue) each having a different persistence time. While blue phosphors have a persistence time of several microseconds as short as possible, red and green phosphors have a long persistence time of several tens of milliseconds until an amount of the phosphors is reduced to not more than 10% of the total.

First, a blur of a motion (hereinafter referred to as motion blur) in an image occurs due to persistence of the phosphors and movement of a line of sight.

Then, when an object displayed with emission of phosphors having different persistence times moves, color shift due to the motion blur occurs (hereinafter referred to as color shift).

A principle of the motion blur and the color shift will be hereinafter described.

First, integration on the retina will be described.

A human perceives light entering the human eyes by integrating an amount of the light incident on the retina, and the human senses the brightness and color based on the integration value through the sense of sight (hereinafter referred to as integration on the retina). The PDP uses the integration on the retina to generate tones by changing a light-emission time without changing brightness of the light.

FIG. 1 explanatorily shows integration on the retina for each color when an image signal of a white dot on a pixel is stationary. FIG. 1 shows that the motion blur does not occur when there is no change in a time distribution of emitted light from a PDP; in the integration on the retina; and in the line of sight.

Light emitted during one field of the PDP is basically composed of: signal components, for example, of 10 to 12 sub-fields each having a different gray value; and persistence components of fields subsequent to the 10 to 12 sub-fields. However, blue phosphors have an extremely short persistence time. Thus, the following description assumes that only the blue phosphors do not include any persistence component. (a) in FIG. 1 shows a time distribution of light emission during one field period of one white pixel including stationary red, green, and blue image signals each having 255 as an image value (hereinafter represented as red: 255, green: 255, and blue: 255). In other words, a red signal component 201 is followed by a red persistence component 204, and a green signal component 202 is followed by a green persistence component 205. In the case of a blue phosphor, only a blue signal component 203 emits light.

The integration on the retina is performed on the emitted light of red, green, and blue phosphors as shown in (b) of FIG. 1. In other words, the integration on the retina is performed on the red signal component 201 and the red persistence component 204 along a line of sight 206 that is fixed to obtain a red-signal-component integral quantity 207 and a red-persistence-component integral quantity 210 on the retina. Consequently, a human perceives the sum of these integral quantities as a red color through the sense of sight. Similarly, the integration on the retina is performed on the green signal component 202 and the green persistence component 205 to obtain a green-signal-component integral quantity 208 and a green-persistence-component integral quantity 211 on the retina. Consequently, a human perceives the sum of these integral quantities as a green color through the sense of sight. Finally, the integration on the retina is performed on the blue signal component 203 to obtain a blue-signal-component integral quantity 209 on the retina. Consequently, a human perceives the integral quantity as a blue color through the sense of sight.

Although the obtained integral quantities of the red, green, and blue signals are equal, a human perceives them as white. This is because emitted light includes the blue-signal-component integral quantity 209 greater than the red-signal-component integral quantity 207 and the green-signal-component integral quantity 208 by the red persistence component 210 and the green persistence component 211. In other words, although the red, green, and blue image signals have the same value, the blue signal component on the PDP has intensity of light emission higher than those of the red and green signal components.

Thus, when the line of sight is fixed, no motion blur occurs.

However, when the line of sight moves and phosphors including red and green persistence components emit light, motion blur occurs. Furthermore, when phosphors having no blue persistence component emit light to display an object, the color shift occurs due to a difference in a time distribution of light emitted from each of the phosphors.

FIG. 2 explanatorily shows integration on the retina for each color when a line of sight traces a white image signal in a pixel. This integration on the retina will be explained using FIG. 2.

(a) in FIG. 2 shows a time distribution of light of 2 field periods when a white dot (red: 255, green: 255, and blue: 255) in a pixel is horizontally displaced to the right in a black background (red: 0, green: 0, and blue: 0) at a predetermined velocity. However, there is no difference between light emission of one field period and the light emission in (a) of FIG. 1 despite the displacement operation. In other words, red signal components 301 and 306 are followed by red persistence components 304 and 309, and green signal components 302 and 307 are followed by green persistence components 305 and 310. In the case of a blue phosphor, only blue signal components 303 and 308 emit light.

(b) of FIG. 2 shows integral quantities for each color on the retina in the case of t=T to 2T (T represents one field period) when a line of sight is fixed (a line of sight 311). In this case, the integration on the retina is performed on the red persistence component 304 and the green persistence component 305 respectively in positions of integral quantities 312 and 313. Furthermore, the integration on the retina is performed on the red signal component 306 and the red persistence component 309 in an identical position to obtain integral quantities 314 and 317, respectively. Similarly, the integration on the retina is performed on the green signal component 307 and the green persistence component 310 in an identical position to obtain integral quantities 315 and 318, respectively. The integration on the retina is performed on the blue signal component 308 to obtain an integral quantity 316. As a result, only red and green persistence remain in the positions of the integral quantities 312 and 313, it causes color shift, and a human perceives it as yellow. However, since the color shift occurs in a very short period of one field period, the color shift poses almost no problem.

However, the motion blur occurs and causes a problem of the color shift to occur when the line of sight traces a white dot in the one pixel. This will be described with reference to (c) in FIG. 2.

(c) in FIG. 2 shows that integral quantities for each color on the retina in the case of t=T to 2T when the line of sight (line of sight 319) traces a white dot. Since tracing the dots continuously, the line of sight sequentially moves to the right according to the passage of time, as the line of sight 319. Thereby, integration on the retina is performed on each color along the line of sight 319. In other words, the integration on the retina is performed on the red signal component 306, the green signal component 307, and the blue signal component 308 to obtain integral quantities 320, 321, and 322, respectively. The integration on the retina is performed on the red persistence components 304 and 309 and the green persistence components 305 and 310 in the case of t=T to 2T to respectively obtain integral quantities 323 and 324 each having a geometry like a tailing. As a result, a human perceives the image as shown in (d) of FIG. 2. In other words, the signal components 320, 321, and 322 of each color on the retina are perceived as somewhat blue as shown by the integral quantity 325. Moreover, the persistence components 323 and 324 on the retina are perceived as a yellow tailing shown by the integral quantity 326. When a line of sight traces a moving object, integration is performed on several fields continuously. Thus, the motion blur and the color shift caused by the motion blur become more visible and the image quality is degraded subjectively.

As such, although only one white pixel originally is displaced, color shift occurs in a moving direction when a line of sight traces a moving object. The color shift causes image components to be perceived as somewhat blue and a persistence component to be perceived as yellow.

This is the principle of the motion blur and the color shift occurring when an object to be displayed with light emission of a phosphor including a persistence component is displaced.

The motion blur and the color shift in each pixel overlap with each other when there is a plurality of pixels, in other words, an image including the plurality of pixels.

FIG. 3 explanatorily shows integration on the retina for each signal component and each persistence component when a line of sight traces a white rectangle object in a gray background. (a) in FIG. 3 shows a state where the white rectangle object (red: 255, green: 255, and blue: 255) is horizontally displaced to the right at a predetermined velocity in the gray background (red: 128, green: 128, and blue: 128) using an image signal viewed on a PDP.

Next, (b) in FIG. 3 shows a time distribution of one field period of light emitted from one horizontal line that has been extracted from the image signal shown in (a) of FIG. 3. In other words, a signal component 401 emits light, and subsequently a persistence component 402 emits light. Thus, the persistence persists in the next field.

Then, a line of sight 403 subsequently moves to the right according to the passage of time since the line of sight continuously traces movement of the white rectangle object. The integration on the retina is performed along the line of sight. More specifically, the integration is performed on a component S1 included in the signal component 401 in a position P1 to calculate an integral quantity I1. Furthermore, integration is performed on: a component S2 included in the signal component 401 in a position P2 to calculate an integral quantity I2; a component S3 included in the signal component 401 in a position P3 to calculate an integral quantity I3; a component S4 included in the signal component 401 in a position P4 to calculate an integral quantity I4; a component S5 included in the signal component 401 in a position P5 to calculate an integral quantity I5; a component S6 included in the signal component 401 in a position P6 to calculate an integral quantity I6; a component S7 included in the signal component 401 in a position P7 to calculate an integral quantity I7; and a component S8 included in the signal component 401 in a position P8 to calculate an integral quantity I8. As a result, an integral quantity 404 of the signal component as shown in (c) of FIG. 3 is obtained from the signal component 401. Furthermore, integration is performed on: a component S11 included in the persistence component 402 in the position P1 to calculate an integral quantity I11; a component S12 included in the persistence component 402 in the position P2 to calculate an integral quantity I12; a component S13 included in the persistence component 402 in the position P3 to calculate an integral quantity I13; a component S14 included in the persistence component 402 in the position P4 to calculate an integral quantity I14; a component S15 included in the persistence component 402 in the position P5 to calculate an integral quantity I15; a component S16 included in the persistence component 402 in the position P6 to calculate an integral quantity I16; a component S17 included in the persistence component 402 in the position P7 to calculate an integral quantity I17; and a component S18 included in the persistence component 402 in the position P8 to calculate an integral quantity I18. As a result, an integral quantity 405 as shown in (d) of FIG. 3 is obtained from the persistence component 402.

Here, since only a white object is displaced in a gray background, other colors such as blue or yellow should not be perceived. As described above, white represented by signal components on the PDP is perceived as somewhat blue, persistence components are perceived as yellow, and consequently, a sum of these components are perceived as white. Thus, the integral quantity 404 of the signal components needs to be proportioned to the integral quantity 405 of the persistence components on each coordinate position. However, as shown in (d) of FIG. 3, the persistence component 405 has excess or deficiency (hereinafter referred to as motion blur component). In other words, a persistence excess amount 408 occurs in the vicinity of a region 406 where a value of a red or a green image signal is reduced from a previous field to a current field (hereinafter referred to as reduced intensity region) and the region is perceived as yellow. On the other hand, a persistence deficiency amount 409 occurs in the vicinity of a region 407 where a value of a red or a green image signal is increased from a previous field to a current field (hereinafter referred to as increased intensity region) and the region is perceived as blue.

This is the principle of the motion blur and the color shift.

Patent Reference 1 suggests a method for reducing color shift caused by the persistence excess in a vicinity of the reduced intensity region by generating a pseudo-persistence signal from a current field and adding the generated pseudo-persistence signal to the current field. The pseudo-persistence signal has a broken-line characteristic identical to those of the red and green phosphors with respect to a blue image signal.

Patent Reference 1: Japanese Unexamined Patent Application Publication No. 2005-141204

DISCLOSURE OF INVENTION

Problems that Invention is to Solve

For example, when a region to which a blue pseudo-persistence signal has been added is accurately calculated, adding the blue pseudo-persistence signal to a current field in the method suggested in Patent Reference 1 corresponds to adding the blue pseudo-persistence signal to a region where the persistence excess amount 408 appears as exemplified in FIG. 3. In other words, color shift can be solved by adding an integral quantity of a blue pseudo-persistence signal to integral quantities of a red persistence component and a green persistence component. However, there is no change in having unnecessary integral quantities. Furthermore, adding a blue pseudo-persistence signal to a current field is, in fact, the same as actively adding a motion blur to a blue image signal. Thus, there is a problem that the motion blur further increases. Moreover, Patent Reference 1 does not take a region having the persistence deficiency amount 409 into account.

The present invention relates to an image display apparatus using phosphors each having a persistence time, and has an object of providing the image display apparatus and an image displaying method that are capable of reducing a motion blur caused by movement of an object.

Means to Solve the Problems

In order to realize the object, the image display apparatus according to the present invention is an image display apparatus that displays an image using phosphors each having a persistence time, and includes: a motion detecting unit configured to detect motion information from an inputted image signal; a correction signal calculating unit configured to calculate a correction signal for correcting image degradation using the motion information, the image degradation being caused by persistence and a motion of the image signal; and a correcting unit configured to correct the image signal using the calculated correction signal.

Since a motion blur is corrected in image signals corresponding to phosphors each having a persistence time, in other words, generally only red and green image signals, a motion blur caused by movement of a line of sight can be corrected with higher precision. As a result, a problem of color shift caused by the motion blur can be fundamentally solved, and thus no color shift occurs.

Here, a persistence time is a time period necessary for an amount of light of the emitted phosphors to be attenuated to equal to or less than 10% of the total amount of light at the time of immediate emission.

Furthermore, motion information includes a motion region, a motion direction, and a matching difference when a motion is detected. Here, the motion region is a region, for example, where an object in an inputted image moves from a previous field to a current field.

Furthermore, image degradation corresponds to a motion blur of an object displayed with emission of phosphors including persistence components. When a moving object is displayed with emission of light of phosphors having different persistence times, image degradation also includes color shift caused by the motion blur.

Furthermore, a correction signal corresponds to a motion blur component. Here, a motion region may be specified by a pixel unit or a region unit including plural pixels. Furthermore, the motion detecting unit may detect a motion region of the image signal as the motion information, and the correction signal calculating unit may calculate a correction signal for attenuating the image signal in a region where a value of the image signal is smaller than a value of a previous field and in a vicinity of the region, the region being included in the motion region and a vicinity of the motion region.

The previous field in the present invention refers to fields prior to the current field, and thus the previous field is not limited to an immediate previous field.

Thereby, a motion blur in a reduced intensity region or in a vicinity of the reduced intensity region can be reduced, and accordingly, yellow color shift can be corrected. The yellow color shift is caused by the motion blur and is visible, for example, when a line of sight traces movement of a white object can be corrected. Furthermore, the motion detecting unit may detect a motion region of the image signal as the motion information, and the correction signal calculating unit may calculate a correction signal for amplifying the image signal in a region where a value of the image signal is larger than a value of a previous field and in a vicinity of the region, the region being included in the motion region and a vicinity of the motion region.

Thereby, a motion blur in a reduced intensity region or in a vicinity of the reduced intensity region can be reduced, and accordingly, color shift can be corrected. The color shift is caused by the blue motion blur and is visible, for example, when a line of sight traces movement of a white object can be corrected. Furthermore, the motion detecting unit may calculate a velocity of a motion in the motion region, and the correction signal calculating unit may correct an amount of change between a value of the image signal in a current field and a value of the image signal in a previous field, in the motion region and in a vicinity of the motion region according to the velocity of the motion, and calculate the corrected amount of change as the correction signal.

Here, the previous field refers to, for example, an immediate previous field.

In order to accurately calculate a motion blur according to the principle, calculation using only a current field is appropriate. However, there is a problem that a circuit scale may increase because integration needs to be performed on the persistence component according to the movement of a line of sight. The persistence component is attenuated due to an exponential function characteristic. Thus, an amount of change between a signal in a current field and the signal in the previous field is corrected according to a velocity of a motion, so that a correction signal is calculated approximately, and a motion blur is corrected. Consequently, correction can be performed in a smaller circuit scale. Furthermore, the correction signal calculating unit may correct the amount of change by performing low-pass filter processing with the number of taps associated with the velocity of the motion. Furthermore, the motion detecting unit may calculate a motion direction of the motion region, and the correction signal calculating unit may asymmetrically correct the amount of change according to the velocity of the motion and the motion direction, and may calculate the corrected amount of change as the correction signal.

Here, an asymmetric correction in a motion direction refers to correction by assigning more weights to a motion direction so as to correct the motion direction to a higher degree. Persistence is attenuated due to the exponential function characteristic, and integration on the retina is performed on the persistence component according to the movement of a line of sight. Thus, a human strongly perceives, forward of the moving line of sight, a portion having a larger amount of light including a persistence component that temporally appears earlier. Thus, asymmetrical correction needs to be performed on a correction signal in a motion direction such that a forward region is corrected to a higher degree than the correction in the motion direction. Thereby, the persistence component can be corrected more precisely.

Without using a motion direction for the correction, there is a possibility that unnecessary correction may be performed, such as correction in a direction opposite to the motion. Furthermore, more precise correction can be performed by using a motion direction. Furthermore, the correction signal calculating unit may correct the amount of change by (i) performing low-pass filter processing with the number of taps associated with the velocity of the motion, and (ii) multiplying a low-pass filter passing signal on which the low-pass filter processing has been performed, by an asymmetrical signal generated by using two straight lines and a quadratic function according to the motion direction.

Here, since a method for shaping a correction signal using two straight lines and one quadratic function is one of the examples, any methods may be used as long as a correction signal value forward of a motion direction becomes larger.

Furthermore, the motion detecting unit may calculate the motion information regarding the motion region and motion information reliability indicating reliability of the motion information, and the correction signal calculating unit may attenuate the correction signal as the motion information reliability is lower.

The motion information includes, for example, a velocity, a motion direction, and a motion vector in a moving image, and a difference calculated in detecting the motion vector (hereinafter referred to as difference). Furthermore, a difference represents a sum of absolute values (SAD), for example, to be used in two-dimensional block matching between each pixel of two-dimensional blocks in a reference field and each pixel of two-dimensional blocks in a current field. The motion detecting unit is a unit that outputs motion information, for example, a unit that may perform two-dimensional block matching. Furthermore, motion information reliability is a value that decreases when reliability of motion detection is lower or when correlation between motion information and a tendency of tracing an object by a human's line of sight is lower.

Motion detection cannot totally detect actual motions, and not every motion is traced by a human's line of sight even when the motions can be completely detected. Thus, in the case where it is highly likely that a motion is erroneously detected, unnecessary correction (hereinafter referred to as unfavorable consequence) can be suppressed by attenuating a correction signal.

Furthermore, the motion detecting unit may calculate the velocity of the motion in the motion region as the motion information, and calculate the motion information reliability so that the motion information reliability becomes lower in inverse proportion to the velocity of the motion.

In other words, correction is weakened when a motion is too fast. The human tends not to trace a motion that is too fast through the sense of sight. Furthermore, when a too fast motion causes a correction failure, an unfavorable consequence spreads widely. In such a case, the unfavorable consequence can be suppressed by weakening the correction effect.

Furthermore, the motion detecting unit may calculate a difference in a corresponding region between a current field and a previous field as the motion information, and calculate the motion information reliability so that the motion information reliability becomes lower in inverse proportion to the difference.

In other words, correction is weakened when a difference is too large. There are cases where motion detection fails. Furthermore, when a difference is large, it is highly likely that the motion detection fails. In such a case, the unfavorable consequence can be suppressed by weakening the correction effect.

Furthermore, the motion detecting unit may calculate, as the motion information, a difference in a corresponding region between a current field and a previous field and a difference of a vicinity of the corresponding region between the current field and the previous field, and calculate the motion information reliability so that the motion information reliability becomes lower in inverse proportion to a difference between the calculated differences.

In other words, correction is weakened when a motion direction is erroneously detected. There are cases where motion detection fails. Furthermore, when a difference between a difference of motion information that has been detected and a difference of motion information in a vicinity of a region of the detected motion information, for example, motion information at the opposite side is smaller, the reliability of the motion direction is lower. In such a case, the unfavorable consequence can be suppressed by weakening the correction effect.

Furthermore, the motion detecting unit may calculate, as the motion information, a velocity and a motion direction of a motion in the motion region, and calculate the motion information reliability so that the motion information reliability becomes lower in inverse proportion to a difference between (i) the velocity and the motion direction of the motion and (ii) a velocity and a motion direction of a motion in a vicinity of the motion region.

Here, a difference between a difference between (i) a velocity and a motion direction of a motion and (ii) a velocity and a motion direction of a motion in a vicinity of the motion region represents a difference between a motion vector in an object block and an average vector of motion vectors in above, upper left, and left of a calculated block. The difference may be obtained by calculating a dot product between an object motion vector and an average motion vector in a vicinity of the object motion vector.

In other words, correction is weakened when a difference between an object motion and an average motion in a vicinity of the object motion is larger. In many cases, a human perceives peripheral average motions through the sense of sight when small objects move in various directions. In such a case, the unfavorable consequence can be suppressed by weakening the correction effect.

Furthermore, the motion detecting unit may calculate, as the motion information, a velocity and a motion direction of a motion in the motion region, and calculate the motion information reliability so that the motion information reliability becomes lower in inverse proportion to a difference between a difference between (i) the velocity and the motion direction of the motion and (ii) a velocity and a motion direction of a motion in a corresponding region of the previous field.

More specifically, for example, in the case of two-dimensional block matching, a difference between an object motion vector in a two-dimensional block and a motion vector in a two-dimensional block prior to a current field pointed by the object motion vector is used. The difference may be obtained by calculating a dot product between such motion vectors.

In other words, the correction signal calculating unit attenuates a correction signal when a motion in a region largely varies in two field periods. A human tends to trace a motion that continues for periods that are consecutive to some extent, and tends not to trace a motion that does not continue for consecutive periods through the sense of sight. In such a case, the unfavorable consequence can be suppressed by weakening the correction effect. Here, not only change in a motion for 2 field periods but also change in a motion for much longer field periods may be used, and furthermore, temporal change between motion vectors may be calculated to take an acceleration vector of a motion into account.

The aforementioned configurations may be combined each other as long as they do not depart from the scope of the present invention.

Furthermore, the present invention may be realized not only as such an image display apparatus but also as an image display method having the characteristic units of the image display apparatus as steps and as a program that causes a computer to execute such steps. Such program can obviously be distributed with a recording medium such as a CD-ROM, and via a transmission medium, such as the Internet.

Effects of the Invention

According to the image display apparatus that uses phosphors each having a persistence time and the image displaying method of the present invention, the motion blur can be reduced. Accordingly, color shift caused by the motion blur of a motion of an object can be reduced. Here, the object is to be displayed with emission of emitters having different persistence times.

NUMERICAL REFERENCES

Figure 1:
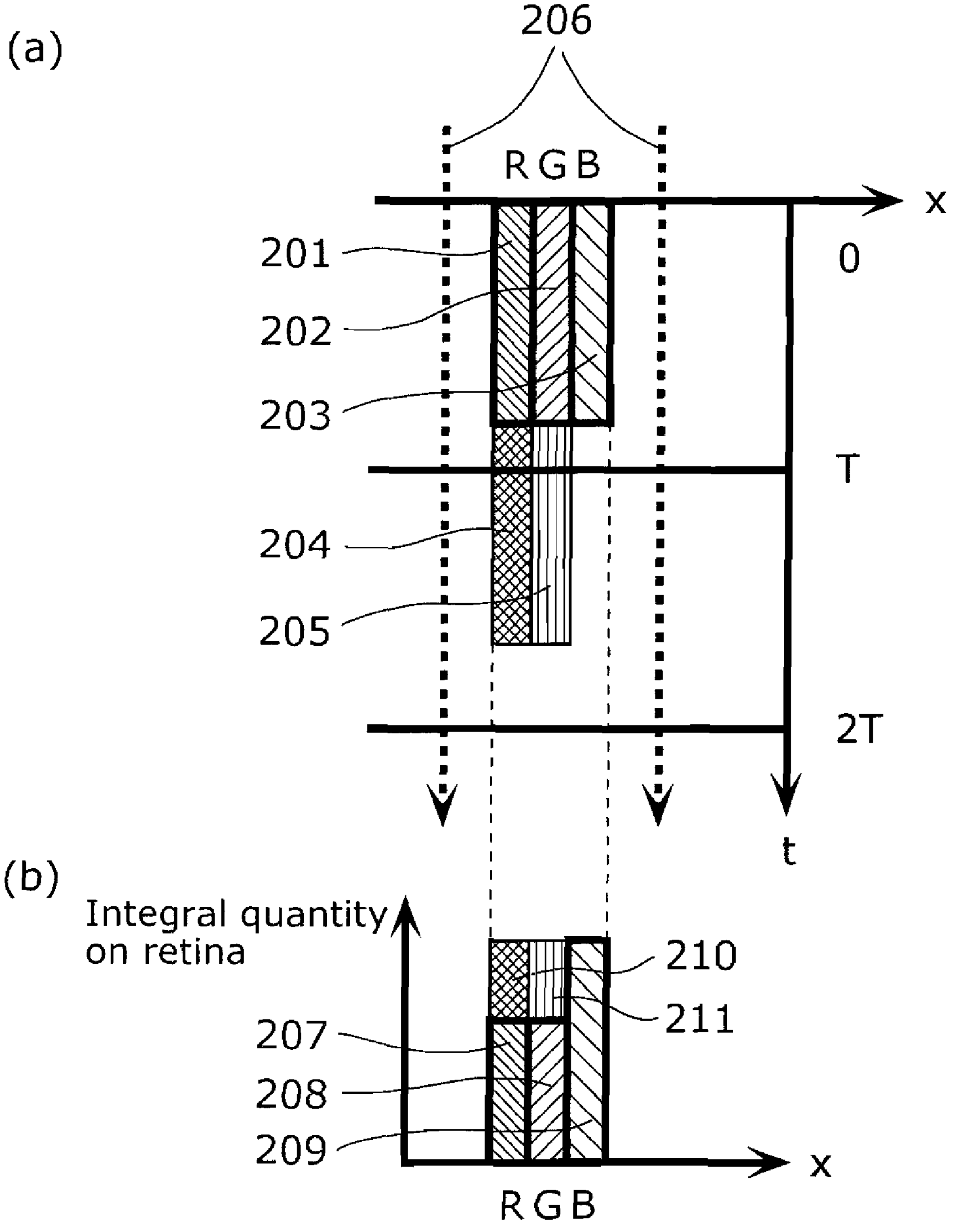
FIG. 1 explanatorily shows integration on the retina for each color when an image signal of a white dot in a pixel is stationary, and respectively shows: (a) a distribution of light emission in a temporal direction for one field period, and (b) integral quantities on the retina.
Figure 2:
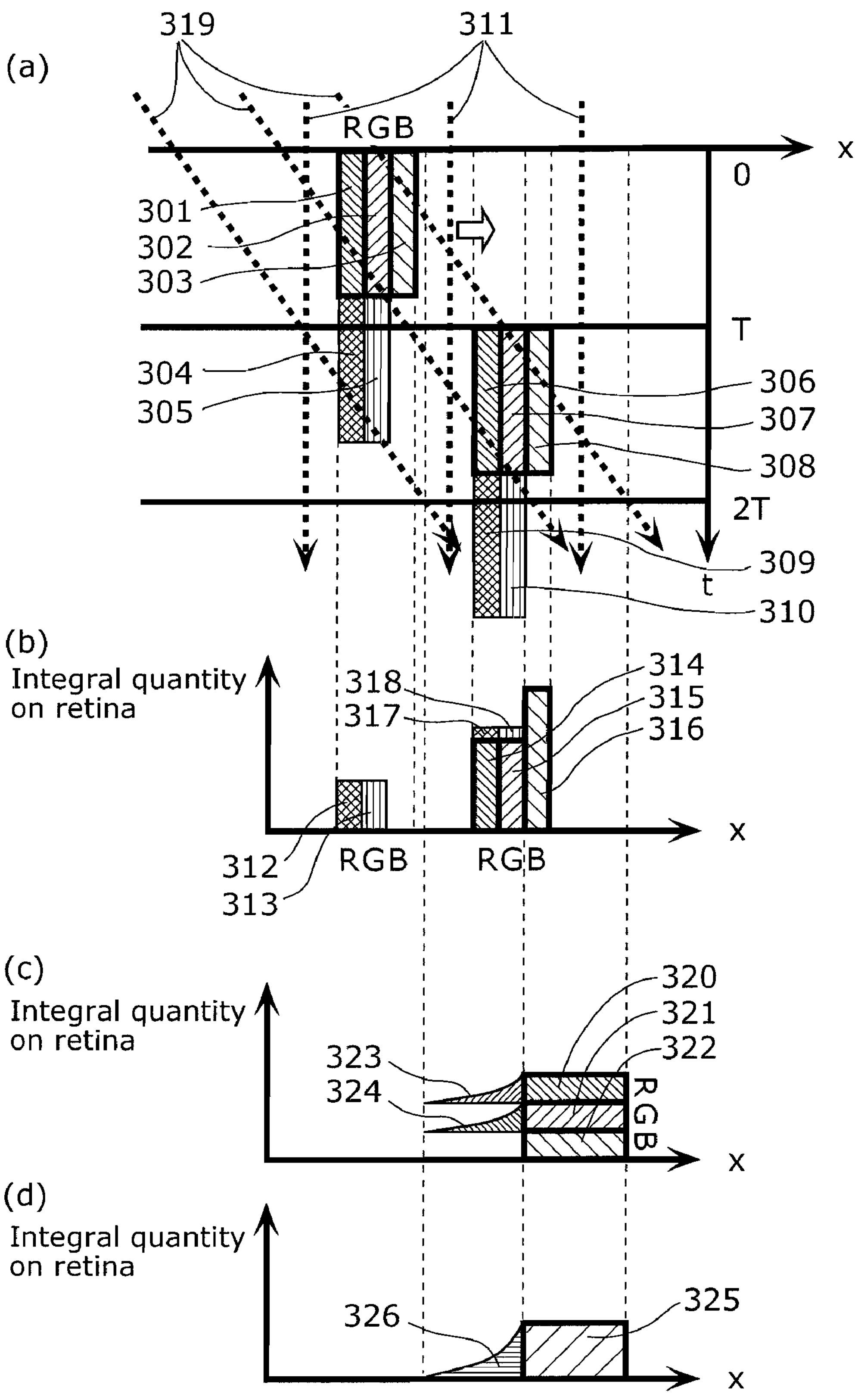
FIG. 2 explanatorily shows integration on the retina for each color when a line of sight traces a white image signal on a pixel, and respectively shows: (a) a distribution of light emission in a temporal direction for 2 field periods; (b) integral quantities for each color on the retina in the case of t=T to 2T when a line of sight is fixed; (c) integral quantities for each color on the retina in the case of t=T to 2T when the line of sight traces the white image signal; and (d) a view on the retina in the case of t=T to 2T when the line of sight traces the white image signal.

1 Image display apparatus
2 Motion detecting unit
3 Correction signal calculating unit
4 Correcting unit
201, 301, 306 Red signal component
202, 302, 307 Green signal component
203, 303, 308 Blue signal component
204, 304, 309 Red persistence component
205, 305, 310 Green persistence component
206, 311 Line of sight when fixed
207 Integral quantity of a red signal component on the retina
208 Integral quantity of a green signal component on the retina
209 Integral quantity of a blue signal component on the retina
210 Integral quantity of a red persistence component on the retina
211 Integral quantity of a green persistence component on the retina
312 Integral quantity, on the retina, of a red persistence component persisting from a previous field during a period when a line of sight is fixed in the case of t=T to 2T
313 Integral quantity, on the retina, of a green persistence component persisting from a previous field during a period when a line of sight is fixed in the case of t=T to 2T
314 Integral quantity of a red signal component on the retina during a period when a line of sight is fixed in the case of t=T to 2T
315 Integral quantity of a green signal component on the retina during a period when a line of sight is fixed in the case of t=T to 2T
316 Integral quantity of a blue signal component on the retina during a period when a line of sight is fixed in the case of t=T to 2T
317 Integral quantity of a red persistence component on the retina during a period when a line of sight is fixed in the case of t=T to 2T
318 Integral quantity of a green persistence component on the retina during a period when a line of sight is fixed in the case of t=T to 2T
319 A line of sight when tracing an object
320 Integral quantity of a red signal component on the retina during a period when a line of sight traces an object in the case of t=T to 2T
321 Integral quantity of a green signal component on the retina during a period when a line of sight traces an object in the case of t=T to 2T

322 Integral quantity of a blue signal component on the retina during a period when a line of sight traces an object in the case of t=T to 2T
323 Integral quantity of a red persistence component on the retina during a period when a line of sight traces an object in the case of t=T to 2T
324 Integral quantity of a green persistence component on the retina during a period when a line of sight traces an object in the case of t=T to 2T
325 View of a signal component on the retina during a period when a line of sight traces an object in the case of t=T to 2T
326 View of a persistence component on the retina during a period when a line of sight traces an object in the case of t=T to 2T
401 Signal component
402 Persistence component
403 Line of sight when tracing an object
404 Integral quantity of a signal component on the retina when a line of sight traces an object
405 Integral quantity of a persistence component on the retina when a line of sight traces an object
406 Reduced intensity region
407 Increased intensity region
408 Persistence excess amount in a vicinity of a reduced intensity region
409 Deficiency amount in a vicinity of an increased intensity region
410 An example of a correction signal geometry for subtraction by red and green image signals in a vicinity of a reduced intensity region
411 An example of a correction signal geometry for addition by red and green image signals in a vicinity of an increased intensity region
412 An example of a correction signal geometry for addition by a blue image signal in a vicinity of a reduced intensity region
413 An example of a correction signal geometry for subtraction by a blue image signal in a vicinity of an increased intensity region
600 Image display apparatus of the first embodiment
601 One-field delay device
602, 608, 611 Subtracter
603, 612 Motion detecting unit
604 Low-pass filter (LPF)
605 Asymmetric gain calculating unit
606 Motion information reliability calculating unit
607 Multiplier
609 Motion information memory
613 Adder
701 Straight part forward of a motion region in an asymmetric gain
702 Quadratic function part in a motion region of an asymmetric gain
703 Straight part in a motion region of an asymmetric gain
801 First gain calculating unit
802 Average coordinate calculating unit
803 Lowest value selecting unit
804 Second gain calculating unit
805 Absolute difference calculating unit
806 Third gain calculating unit
807 Motion vector generating unit
808 Peripheral vector calculating unit
809 Fourth gain calculating unit
810 Fifth gain calculating unit
811 Multiplier
900 Image display apparatus of the third embodiment
901 One-field delay device
902, 905, 909, 911 Subtracter
903 Motion detecting unit
904, 907 Low-pass filter (LPF)
906 Absolute value calculating unit
908 Correction signal region limiting unit
912 Adder

BEST MODE FOR CARRYING OUT THE INVENTION

A base configuration of the present invention and four embodiments including limited constituent elements of the base configuration will be described.

Figure 4:
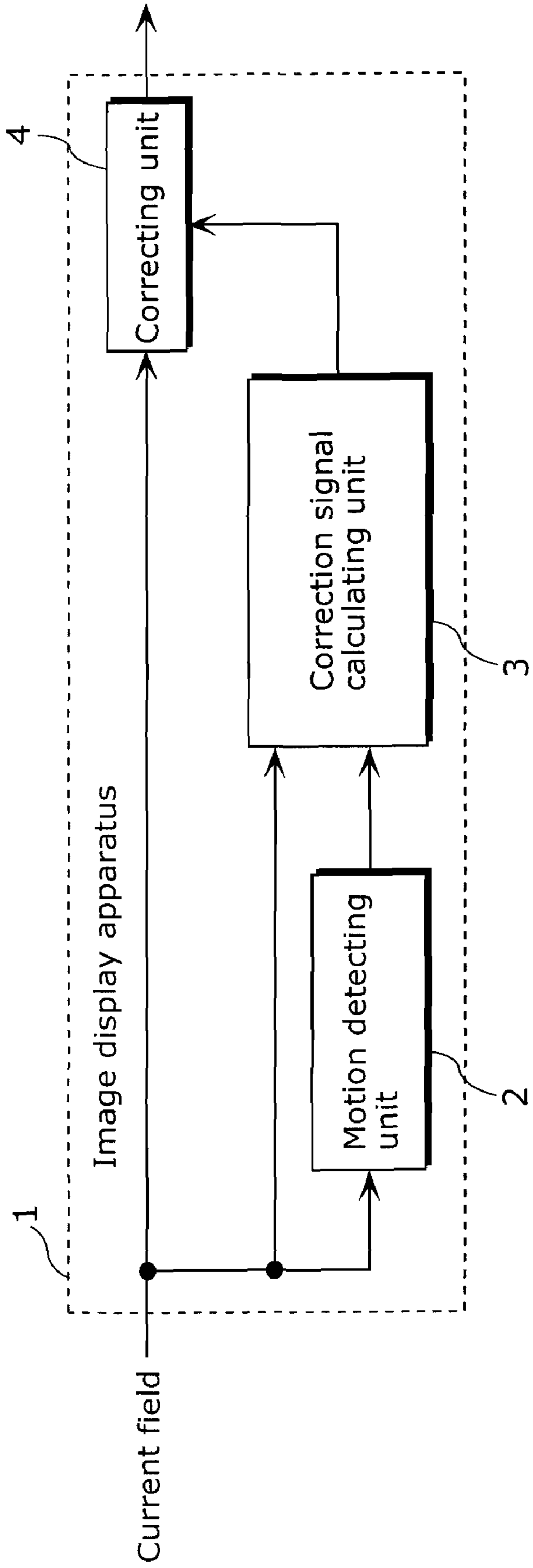
FIG. 4 is a block diagram illustrating a configuration of an image display apparatus as a base configuration of the present invention.
Figure 5:
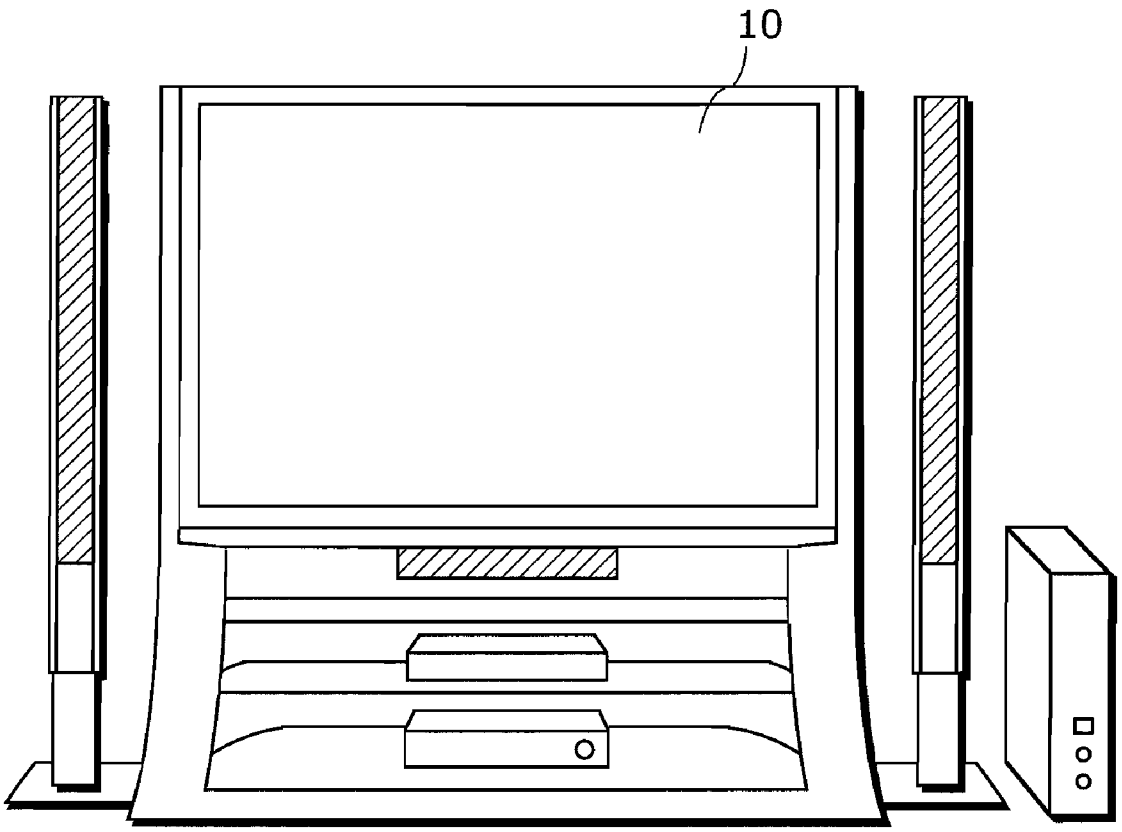
FIG. 5 illustrates a more specific application of the image display apparatus of the present invention.

First, the base configuration of the present invention will be described with reference to FIG. 4. FIG. 4 illustrates a block diagram of a configuration of an image display apparatus as the base configuration, and FIG. 5 illustrates a more specific application of the image display apparatus. An image display apparatus 1 displays an image using red and green phosphors each having a persistence time and a blue phosphor having almost no persistence time. The image display apparatus 1 includes: a motion detecting unit 2 that detects, from an inputted image signal, motion information of a motion, such as a region, a velocity, a direction, and a matching difference; a correction signal calculating unit 3 that calculates a correction signal for a red image signal and a green image signal, using the inputted image signal and the motion information; and a correcting unit 4 that corrects the inputted image signal using the calculated correction signal. More specifically, this image display apparatus 1 can be applied to, for example, a plasma display panel as illustrated in FIG. 5. This base configuration makes it possible to reduce a motion blur.

Next, the four embodiments each including the motion detecting unit 2, the correction signal calculating unit 3, and the correcting unit 4 that are limited as the base configuration. Each of the four embodiments uses a correction signal of a different geometry in a vicinity of a reduced intensity region and an increased intensity region, and either a method for correcting an image with higher precision using a motion direction or a method for correcting an image on a hardware scale without detecting a motion direction (each of the four embodiments combines a different correction method and a correction signal of a different geometry).

In other words, a first embodiment corrects the vicinity of a reduced intensity region using a motion direction, a second embodiment corrects the vicinity of an increased intensity region using a motion direction, a third embodiment corrects the vicinity of a reduced intensity region without using a motion direction, and a fourth embodiment corrects the vicinity of an increased intensity region without using a motion direction.

Hereinafter, the four embodiments will be described one by one.

First Embodiment

The image display apparatus of the first embodiment will be described with reference to FIGS. 6 and 7.

An object of the first embodiment is to reduce a motion blur by calculating a motion blur component in a vicinity of a reduced intensity region for each image signal and subtracting a correction signal from current fields of a red image signal and a green image signal. Furthermore, another object of the first embodiment is to reduce color shift simultaneously by reducing the motion blur.

Furthermore, processing is performed for each horizontal line to reduce a hardware scale in all of the first to fourth embodiments.

Figure 6:
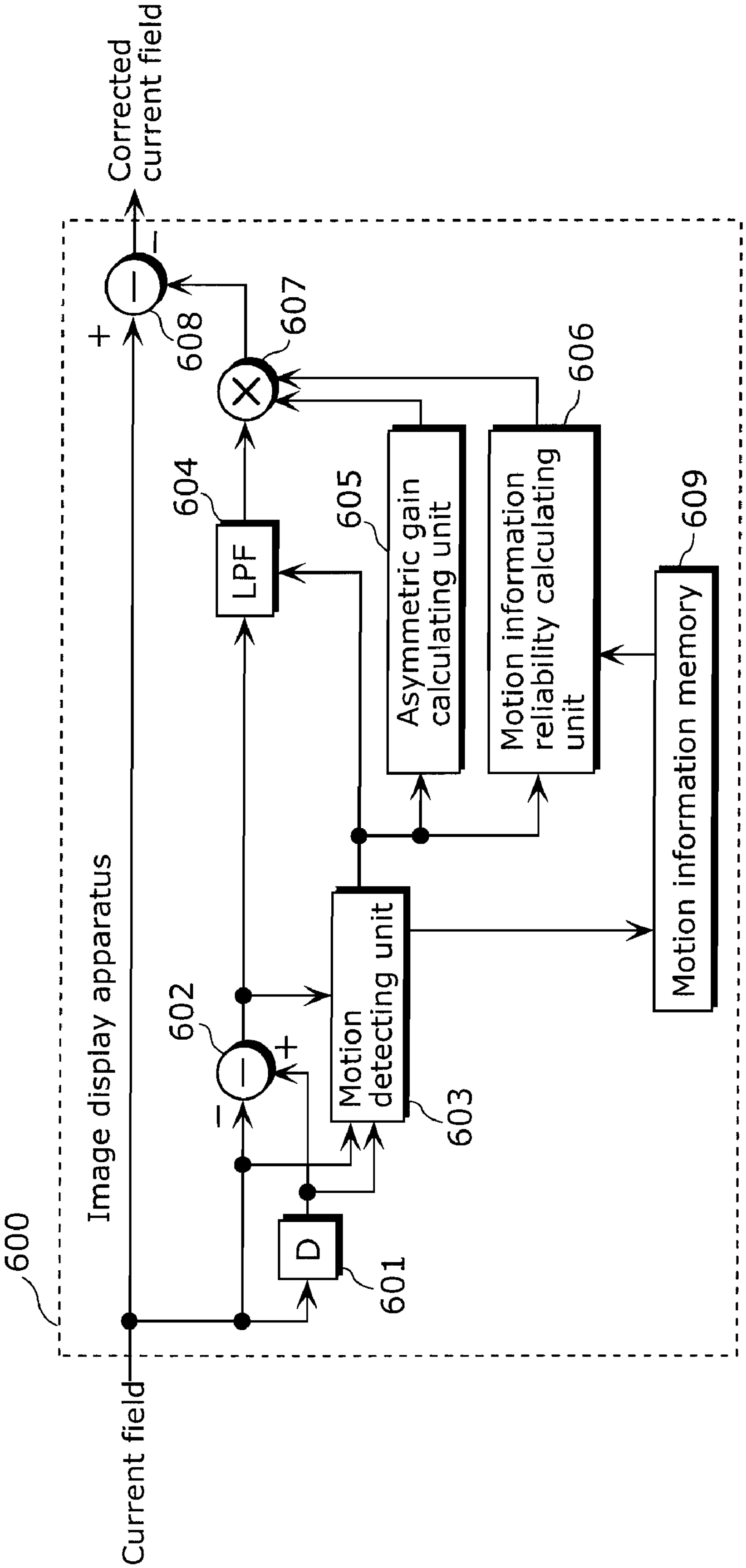
FIG. 6 is a block diagram illustrating the configuration of the image display apparatus of the first embodiment.

FIG. 6 illustrates a block diagram of the configuration of the image display apparatus of the first embodiment. An image display apparatus 600 of the first embodiment includes a one-field delay device 601, a motion detecting unit 603, subtractors 602 and 608, a low-pass filter (hereinafter referred to as LPF) 604, an asymmetric gain calculating unit 605, a motion information reliability calculating unit 606, a multiplier 607, and a motion information memory 609. Here, each of the constituent elements of the image display apparatus 600 does input and output per horizontal line of red, green, and blue image signals.

The one-field delay device 601 delays an inputted current field by one field period, and outputs a previous field that is one field prior to the current field. The subtractor 602 subtracts the current field from the previous field, and outputs a subtraction signal including only positive components. The motion detecting unit 603 detects a motion using the inputted current field, the previous field, and the subtraction signal, and outputs motion information (a motion region, a direction, a velocity, and a difference). The LPF 604 applies the number of taps calculated according to the velocity of the motion to the inputted subtraction signal, and outputs an LPF-passing subtraction signal. The asymmetric gain calculating unit 605 outputs an asymmetric gain for shaping the LPF-passing subtraction signal using the inputted motion information. The motion information reliability calculating unit 606 calculates motion information reliability using: the object motion information outputted from the motion detecting unit 603; motion information of 3 lines that are adjacent to an upper side of a line that is currently being processed and is outputted from the motion information memory 609; and motion information of a region that is present in a previous field and that corresponds to the object motion information. The multiplier 607 multiplies the LPF-passing subtraction signal outputted from the LPF 604 by the asymmetric gain outputted from the asymmetric gain calculating unit 605 by a gain of the motion information reliability outputted from the motion information reliability calculating unit 606. The subtractor 608 subtracts the correction signal from the current fields of the red image signal and the green image signal, and outputs the current is fields in which motion blur has been corrected. The motion information memory 609 stores motion information that has been detected.

Figure 7:
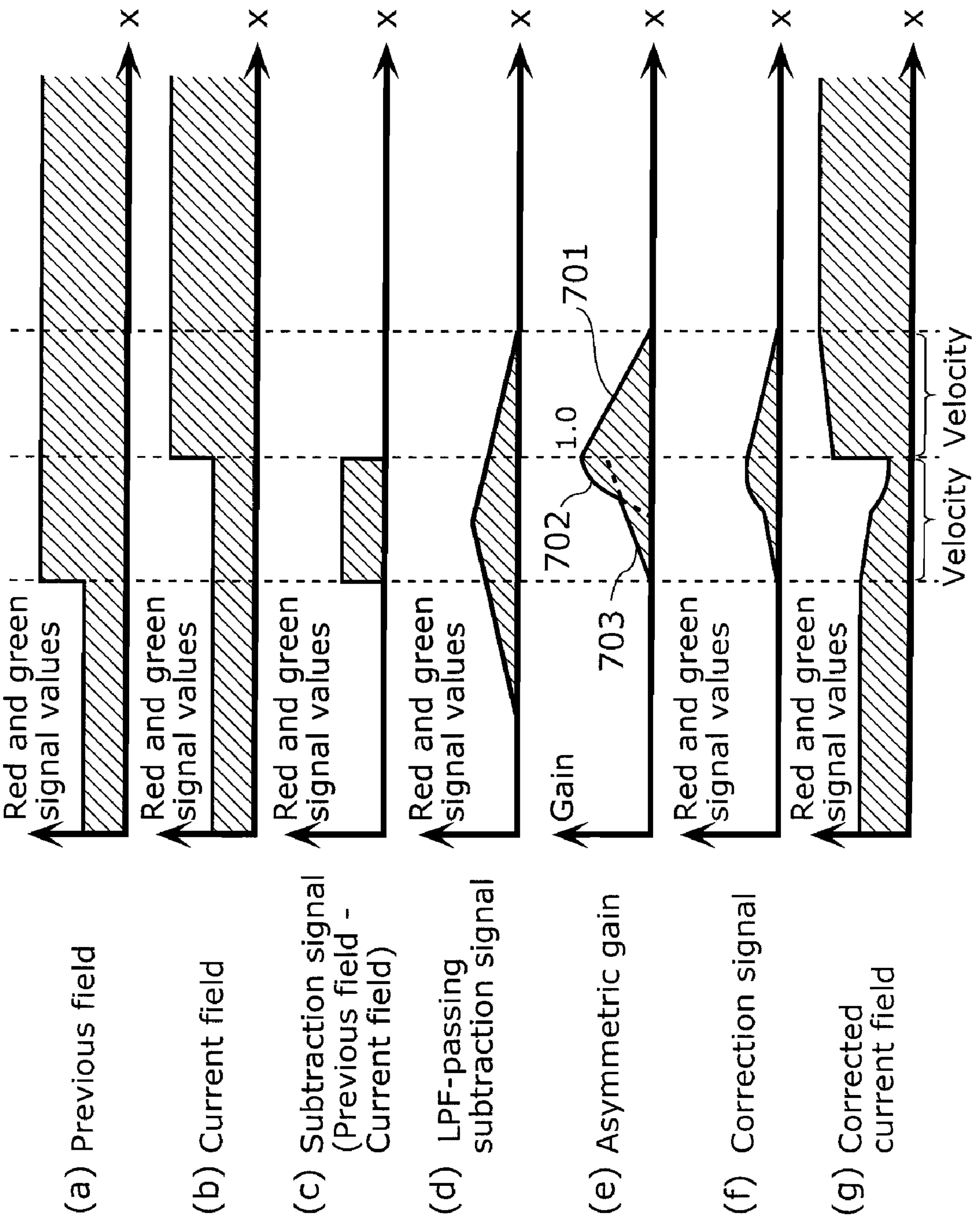
FIG. 7 shows a flow of processing in the image display apparatus according to the first embodiment, and respectively shows: (a) a previous field; (b) a current field; (c) a subtraction signal (previous field-current field); (d) an LPF-passing subtraction signal; (e) an asymmetric gain; (f) a correction signal; and (g) a corrected current field.

(a) to (g) in FIG. 7 explanatorily show a flow of processing in the image display apparatus according to the first embodiment. (a) to (g) in FIG. 7 show each signal for generating a correction signal for the red or green image signal per horizontal line, and changes in each signal.

The following describes processing in the first embodiment in details.

The image display apparatus 600 of the first embodiment receives one horizontal line of a current field, and outputs the horizontal line in which a motion blur has been corrected.

First, a previous field is calculated.

The one-field delay device 601 delays an inputted current field by one field period, and outputs a previous field that is one field prior to the current field. (a) in FIG. 7 shows the previous field, and (b) in FIG. 7 shows the current field.

Second, a subtraction signal is calculated using the inputted previous field and the current field.

The subtractor 602 subtracts the current field from the previous field, and outputs the calculated subtraction signal including only positive components. (c) in FIG. 7 shows this subtraction signal.

Since a motion blur component is in principle similar to the subtraction signal, the subtraction signal is used herein.

As long as a motion blur component can be approximately calculated by deforming, such as a current field or a field prior to the current field, a signal for the calculation is not limited to the subtraction signal.

Third, motion information is detected using the previous field, the current field, and the subtraction signal.

The motion detecting unit 603 detects a motion using the inputted current field, the previous field, and the subtraction signal, and outputs motion information (a motion region, a direction, a velocity, and a difference).

First, the motion detecting unit 603 detects a motion region, and calculates a velocity of the motion region. In other words, the motion detecting unit 603 determines a region that exceeds a predetermined threshold value of one of or both of a red subtraction signal and a green subtraction signal to be a motion region, and a width of the motion region to be a velocity of the motion. Thereby, a reduced intensity region may be defined as the motion region. Furthermore, since motion search, for example, two-dimensional block matching is not performed, a motion region and a velocity can be detected with a reduced circuit scale.

Next, the motion detecting unit 603 calculates a difference, and detects a direction from the calculated difference. In other words, the motion detecting unit 603 calculates sums of absolute difference (hereinafter referred to as SAD) for regions present in a previous field and in a current field. The regions are present in regions left and right of the current field, and the left and right regions have an identical width. Supposedly, the obtained sums of absolute difference are referred to as a left SAD and a right SAD, respectively. In this case, a total sum of differences, for example, a sum of red, green, and blue image signals is used to obtain a SAD. The motion detecting unit 603 determines a motion direction as a left direction when the left SAD is smaller than the right SAD, determines a motion direction as a right direction when the right SAD is smaller than the left SAD, and determines a state as motionless when the right SAD is equal to the left SAD. In the case of the motionless state, no correction is performed on an image signal.

As long as the motion detecting unit 603 detects at least a motion direction and a velocity, using, for example, two-dimensional block matching, any motion detecting method may be used.

Fourth, an LPF-passing subtraction signal is calculated by applying an LPF to a subtraction signal.

A subtraction signal and motion information are inputted to the LPF 604. The LPF 604 applies an LPF having the number of taps calculated according to a velocity of a motion to the inputted subtraction signal, and outputs an LPF-passing subtraction signal. (d) in FIG. 7 shows the LPF-passing subtraction signal. Here, the number of taps represents a velocity of a motion (pixels per field). Furthermore, although an LPF calculates an average of peripheral pixel values, the number of taps and the LPF are not limited to such.

The motion blur component is in principle coextensive in a line of sight with integration on the retina. Thus, the LPF is used for performing necessary processing corresponding to the integration. As long as the processing spatially amplifies a subtraction signal, the processing is not limited to an LPF processing.

Fifth, an asymmetric gain is calculated using motion information.

The asymmetric gain calculating unit 605 outputs an asymmetric gain for shaping an LPF-passing subtraction signal using the inputted motion information. Here, the asymmetric gain calculating unit 605 generates an asymmetric gain using two straight lines and a quadratic function, as shown in (e) in FIG. 7. In other words, the asymmetric gain calculating unit 605 generates an asymmetric gain using combinations of a straight part 701 in a forward region (in this case, an adjacent right region) with respect to a motion region, a quadratic function part 702 in the motion region, and a straight line 703. Furthermore, values of each of the straight part 701, and the quadratic function part 702, and the straight line 703 range 0.0 to 1.0 inclusive. Since a forward region needs to be understood with respect to a motion region, a motion direction is always necessary for generating an asymmetric gain.

Since the motion blur in principle clearly appears as a tailing forward of a motion direction, the asymmetric gain is used for correcting the forward region. Then, a persistence excess amount 408 in a vicinity of a reduced intensity region, for example, as shown in (d) of FIG. 3 is generated by multiplying the asymmetric gain by the subtraction signal LPF signal.

Figure 3:
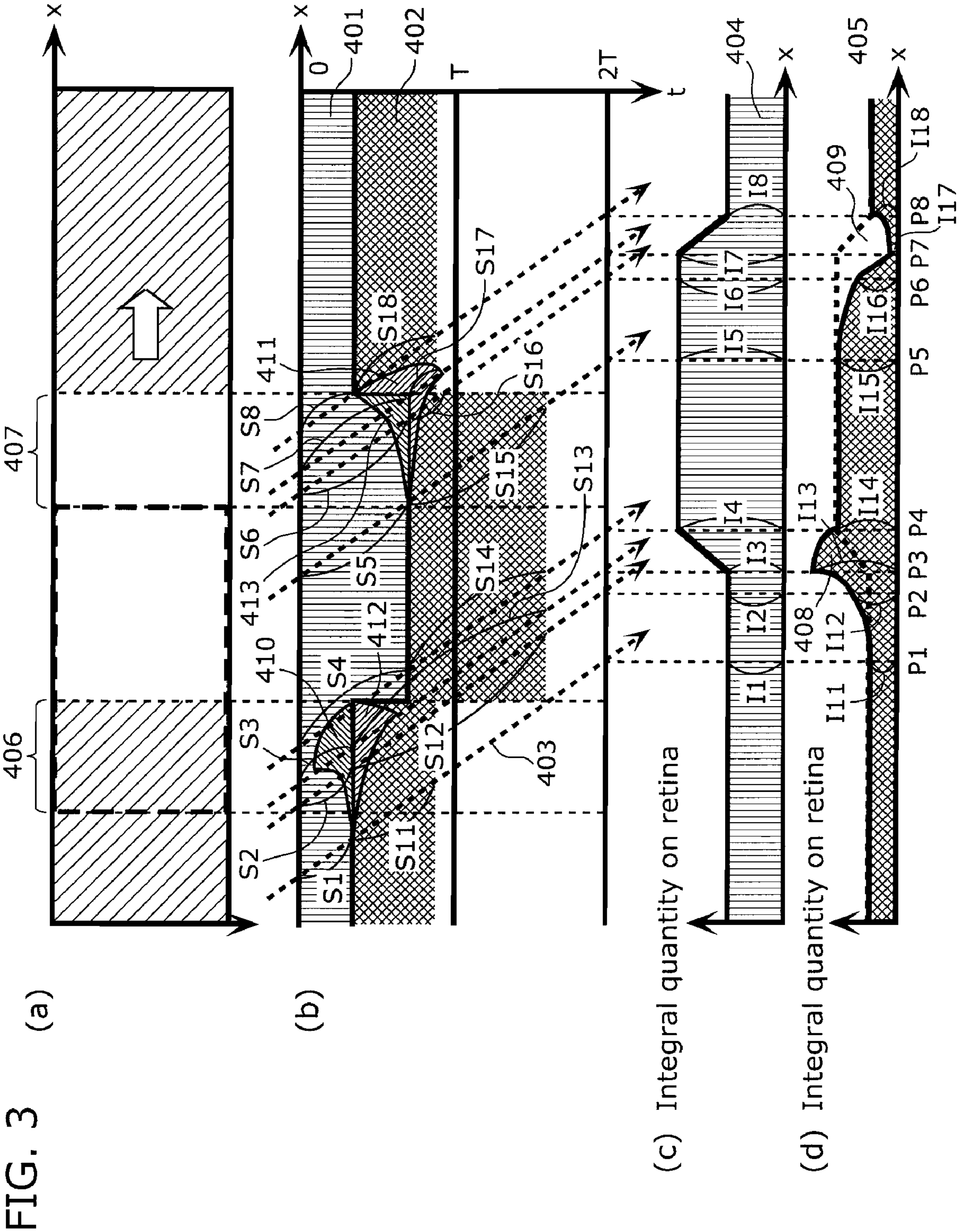
FIG. 3 explanatorily shows integration on the retina for each signal component and each persistence component when a line of sight traces a white rectangle object in a gray background, and respectively shows: (a) a display pattern on the PDP; (b) a distribution of light emission from one horizontal line of an image signal in a temporal direction for 1 field period; (c) an integral quantity of a signal component on the retina when the line of sight traces the white rectangle object; and (d) an integral quantity of a persistence component on the retina when the line of sight traces the white rectangle object.

Although a geometry of the asymmetric gain in (e) of FIG. 7 is obtained under the states in FIGS. 3 and 6, a motion blur component varies depending on a current field inputted. Thus, the geometry is not limited to the geometry in (e) of FIG. 7. Furthermore, for example, as a motion moves at a higher velocity, a geometry of an asymmetric gain can be extended more laterally. As a motion moves at a higher velocity, a region where image quality is degraded becomes larger. Consequently, a region necessary to be corrected also becomes larger.

Sixth, a motion information reliability gain is calculated using motion information.

The motion information reliability calculating unit 606 calculates motion information reliability using: the object motion information outputted from the motion detecting unit 603; motion information of 3 lines that are adjacent to an upper side of a line that is currently being processed and that is outputted from the motion information memory 609; and motion information of a region that is present in a previous field and that corresponds to the object motion information. On the assumption that the motion information reliability is 1.0 in FIG. 7, there is no illustration of the motion information reliability in FIG. 7.

Figure 8:
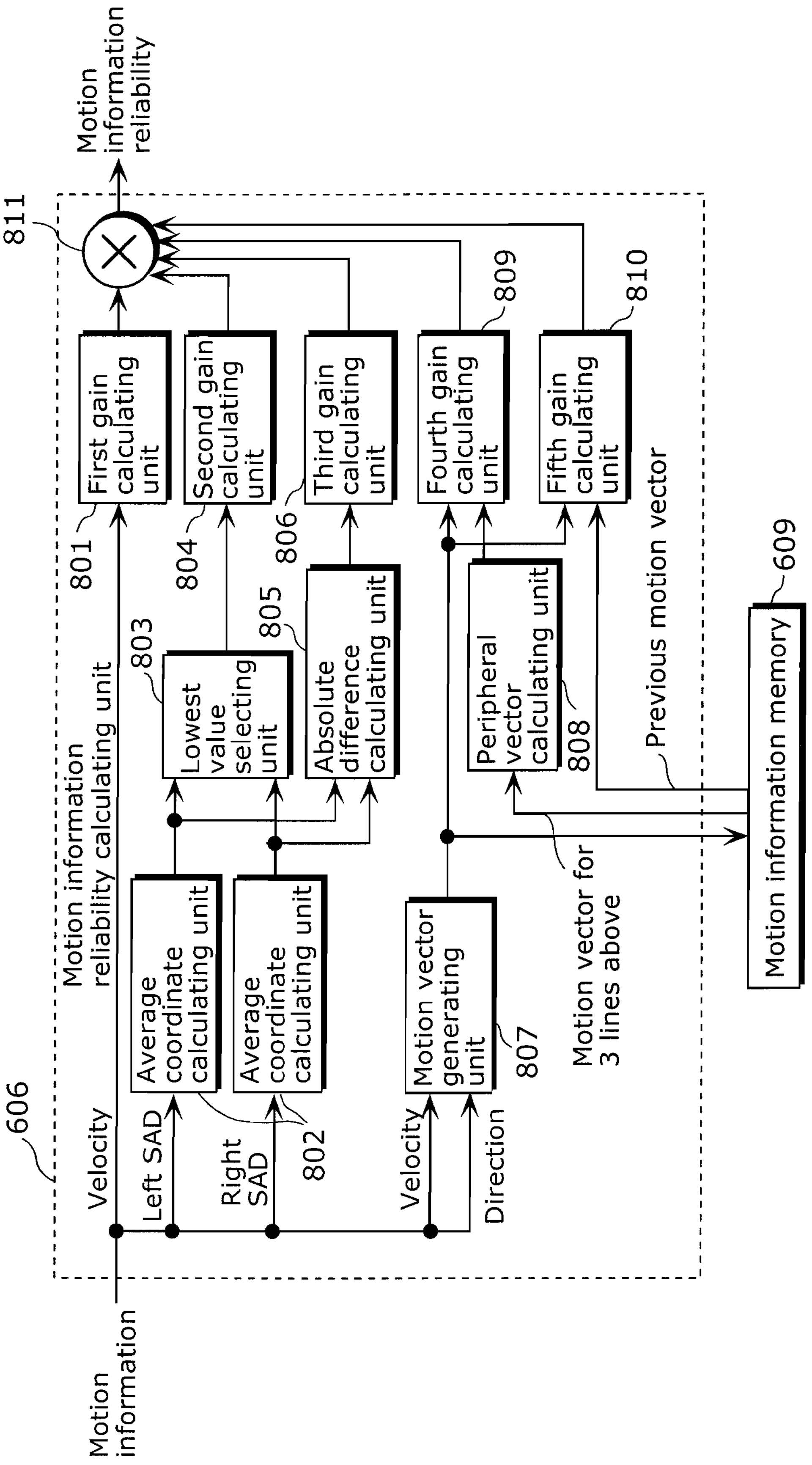
FIG. 8 illustrates a block diagram of the configuration of the motion information reliability calculating unit.

FIG. 8 illustrates a block diagram of a detailed configuration of the motion information reliability calculating unit 606. The motion information reliability calculating unit 606 outputs a product of five gains (hereinafter referred to as first to fifth gains), and includes a first gain calculating unit 801, average coordinate calculating units 802*a* and 802*b*, a lowest value selecting unit 803, a second gain calculating unit 804, an absolute difference calculating unit 805, a third gain calculating unit 806, a motion vector generating unit 807, a peripheral vector calculating unit 808, a fourth gain calculating unit 809, and a fifth gain calculating unit 810.

The following describes each gain in details.

The first gain related to a velocity of a motion will be described first.

The first gain calculating unit 801 is a gain function having a broken-line characteristic, and outputs: 1.0 when a velocity of an inputted motion is lower than a first threshold; a variable that linearly ranges from 1.0 to 0.0 when the velocity is equal to or higher than the first threshold and lower than a second threshold; and 0.0 when the velocity is equal to or higher than the second threshold.

When an unfavorable consequence highly likely occurs due to a higher velocity, the image display apparatus 600 makes it possible to weaken the correction effect or disable the correction.

The second gain related to a difference in motion detection will be described.

First, the average coordinate calculating unit 802*a* and 802*b* respectively obtain an average left SAD and an average right SAD by dividing each of the left SAD and the right SAD by a width of a motion region. Then, the lowest value selecting unit 803 selects a lowest value of these average left SAD and average right SAD. The second gain calculating unit 804 is a gain function having a broken-line characteristic, and outputs: 1.0 when the inputted lowest value is smaller than a first threshold; a variable that linearly ranges from 1.0 to 0.0 when the inputted lowest value is equal to or larger than the first threshold and smaller than the second threshold; and 0.0 when the inputted lowest value is equal to or larger than the second threshold.

As a difference in motion detection becomes larger, the image display apparatus 600 makes it possible to weaken the correction effect or disable the correction.

The third gain related to a direction of a motion will be described.

The absolute difference calculating unit 805 calculates an absolute difference between an average left SAD calculated by the average coordinate calculating unit 802*a* and an average right SAD calculated by the average coordinate calculating unit 802*b*. The third gain calculating unit 806 is a gain function having a broken-line characteristic, and outputs: 0.0 when the inputted absolute difference is smaller than a first threshold; a variable that linearly ranges from 0.0 to 1.0 when the absolute difference is equal to or larger than the first threshold and smaller than a second threshold; and 1.0 when the absolute difference is equal to or larger than the second threshold.

As a difference between a plurality of peripheral motion information is smaller, reliability of the motion direction becomes lower. Thus, the image display apparatus 600 makes it possible to weaken the correction effect or disable the correction.

Although the first to third gains are all generated using a gain function having a broken-line characteristic, a step function using only one threshold or a gain function having a curve characteristic may be used instead.

The fourth gain related to isolation of object motion information from a vicinity of the object motion information will be described.

First, the motion vector generating unit 807 generates a motion vector using a motion direction and a velocity. More specifically, the motion vector generating unit 807 generates values each with a code, such as "+5" in the case of a motion at a velocity 5 in a right direction and "−10" in the case of a motion at a velocity 10 in a left direction. These operations are necessary when a motion direction and a velocity are respectively calculated. However, when a motion is initially converted to a vector, for example, as in two-dimensional block matching, such operation is not necessary.

Next, each motion vector in regions of respectively 1 line, 2 lines, and 3 lines spatially above a line that has been currently processed is outputted from the motion information memory 609 (according to a method identical to a method for generating a motion vector by the motion vector generating unit 807). Then, the motion vectors are inputted to the peripheral vector calculating unit 808. The peripheral vector calculating unit 808 outputs an average vector of the inputted 3 motion vectors as a peripheral vector.

An average vector of motion vectors in adjacent blocks that are above, upper left, and left of a calculated block may be used as a peripheral motion vector, for example, when a motion vector is detected using two-dimensional block matching. As such, a peripheral motion vector may be anything as long as peripheral motion information is spatially used.

Then, the fourth gain calculating unit calculates cosine of an angle between a motion vector outputted from the motion vector generating unit 807 and a peripheral vector outputted from the peripheral vector calculating unit 808, for example, by calculating a dot product. Then, 1 is added to the calculated cosine, and the resulting value is divided by 2 to obtain a value ranging from 1.0 to 0.0 inclusive. The fourth gain calculating unit 809 outputs the obtained value as the fourth gain.

The image display apparatus 600 makes it possible to weaken the correction effect or disable the correction in the case where a difference between an object motion vector and a motion vector in a vicinity of the object motion vector is larger, in other words, in the case where the object motion vector is isolated from motion vectors in a vicinity of the object motion vector.

The fifth gain related to the continuity of a motion will be described.

First, a motion vector that is included in a current field and that is generated by the motion vector generating unit 807 (hereinafter referred to as current motion vector) is inputted to the motion information memory 609, and a motion vector that is in a region of a previous field and that corresponds to the current motion vector (hereinafter referred to as previous motion vector) is outputted.

Then, the fifth gain calculating unit 810 calculates cosine of an angle between the inputted current motion vector and the previous motion vector, for example, by calculating a dot product. Then, 1 is added to the calculated cosine, and the resulting value is divided by 2 to obtain a value ranging from 1.0 to 0.0 inclusive. Finally, the obtained value as the fifth gain is outputted.

The image display apparatus 600 makes it possible to weaken the correction effect or disable the correction in the case where a difference between the inputted current motion vector and the previous motion vector is larger, in other words, in the case where there is no continuity in the motion.

Then, the multiplier 811 outputs a product of the first to fifth gains as motion information reliability.

For reduction in circuit scale, the arithmetic computation may be performed using bit shift operation on all of the first to fifth gains. Furthermore, not all of the first to fifth gains have to be used. For example, the fourth and fifth gains are not used because they need a motion information memory.

Seventh, an LPF-passing subtraction signal is multiplied by an asymmetric gain and a motion information reliability gain to calculate a correction signal.

The multiplier 607 multiplies the LPF-passing subtraction signal outputted from the LPF 604 by the asymmetric gain outputted from the asymmetric gain calculating unit 605 by the motion information reliability gain outputted from the motion information reliability calculating unit 606, and outputs a correction signal. (f) in FIG. 7 shows the obtained correction signal.

Since processing is performed independently one each line in the first to fourth embodiments albeit no illustration in FIG. 6, there are cases where processing variations in a vertical direction may occur depending on execution of processing or non-processing. In order to prevent such processing variations, a correction signal for a line that is currently being processed and an IIR filter that spatially replaces an interior signal included in a correction signal on one line with a current correction signal may be used.

Eighth, a corrected current field is outputted using a current field and a correction signal. (g) in FIG. 7 shows the corrected current field.

The subtractor 608 subtracts the correction signal from the current fields of the red image signal and the green image signal, and outputs the current field in which motion blur has been corrected. The object of the first embodiment is to reduce a motion blur by calculating a motion blur component in a vicinity of a reduced intensity region for each image signal and subtracting a correction signal from current fields of a red image signal and a green image signal. Simultaneously, color shift can be reduced by reducing the motion blur.

Second Embodiment

Figure 9:
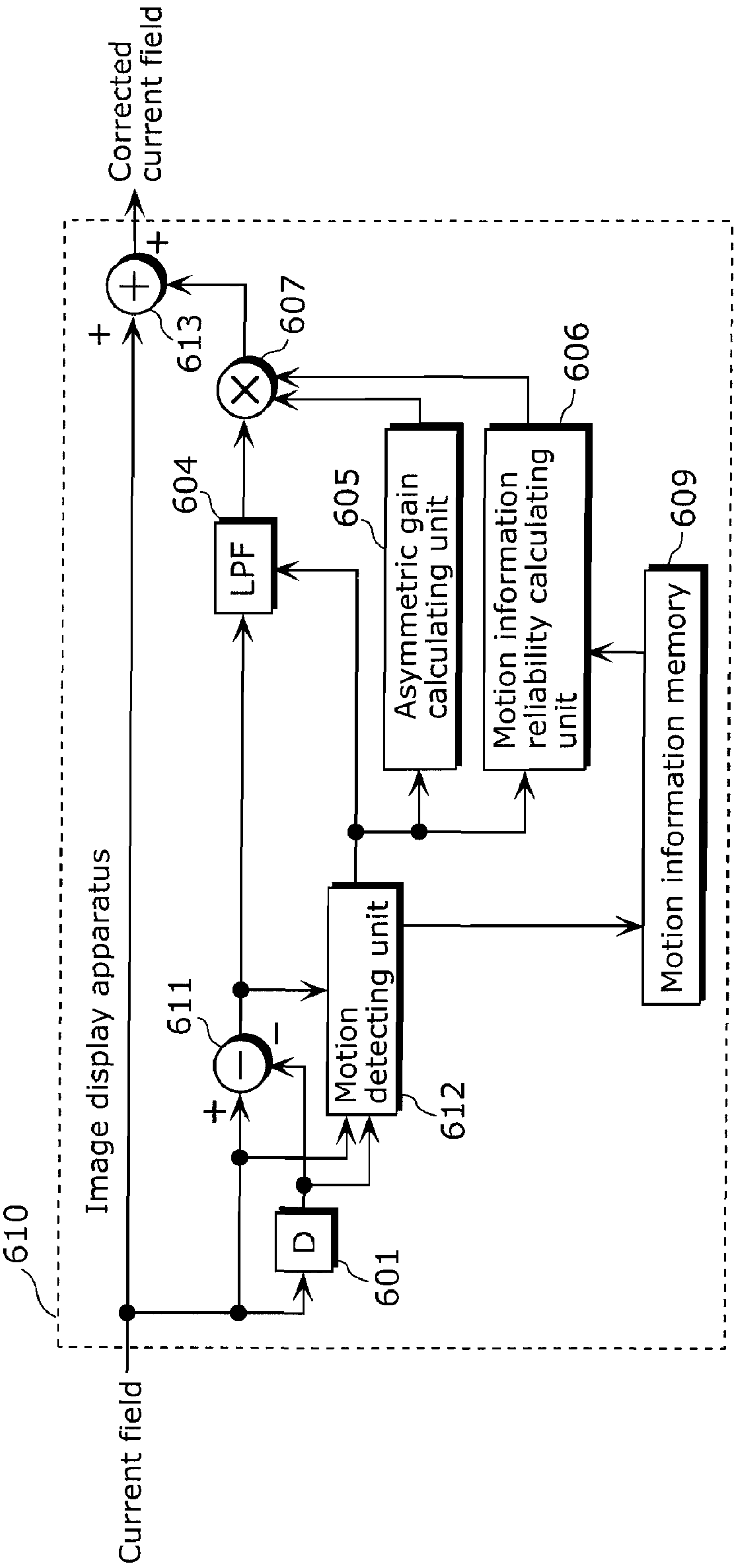
FIG. 9 illustrates a block diagram of the configuration of the image display apparatus according to the second embodiment.

FIG. 9 illustrates a block diagram of a detailed configuration of an image display apparatus according to the second embodiment. The image display apparatus according to the second embodiment is partially changed from that of the first embodiment. The differences will only be described hereinafter.

An object of the second embodiment is to reduce a motion blur by calculating a motion blur component in a vicinity of an increased intensity region for each image signal and adding a correction signal to current fields of a red image signal and a green image signal that have long persistence times. Furthermore, another object of the second embodiment is to reduce color shift simultaneously by reducing the motion blur.

The differences of the configuration with the first embodiment will be described with reference to FIGS. 6 and 9.

An image display apparatus 610 of the second embodiment includes a subtractor 611, a motion detecting unit 612, and an adder 613 that are respectively changed from the subtractor 602, the motion detecting unit 603, and the subtractor 608 of the image display apparatus 600 according to the first embodiment. The following describes the details.

The change from the subtractor 602 to the subtractor 611 will be described.

Terms of subtraction are replaced with each other. In other words, the subtractor 611 subtracts a previous field from a current field, and outputs a subtraction signal including only positive components.

Thereby, an increased intensity region may be defined as a motion region.

The change from the motion detecting unit 603 to the motion detecting unit 612 will be described.

A field to be referred to when a difference is calculated and a motion direction to be detected are changed in reverse. In other words, the motion detecting unit 612 calculates SADs for regions present in a previous field and in a current field. The regions are present in regions left and right of the current field, and the left and right regions have an identical width. Supposedly, the obtained sums of absolute difference are referred to as a left SAD and a right SAD, respectively. The motion detecting unit 612 determines a motion direction as a right direction when the left SAD is smaller than the right SAD, determines a motion direction as a left direction when the right SAD is smaller than the left SAD, and determines a state as motionless when the right SAD is equal to the left SAD. In the case of a motionless state, no correction is performed on an image signal.

The change from the subtractor 608 to the adder 613 will be described.

The operation is changed from subtraction to addition. In other words, the adder 613 adds a correction signal to a current field and outputs the resulting signal. Here, when a current field exceeds 255 when added, the value is outputted as 255, for example.

However, in principle, simply adding a correction signal to red and green image signals is not appropriate. This is because a region as the region 411 needs to be added in consideration of an amount of light incident on the retina to the deficiency amount 409 in a vicinity of the increased intensity region in FIG. 3. This can be achieved in a method of changing the configuration of sub-fields only in this portion. More specifically, light is emitted from red and green sub-fields in a position and at a time on the region 411.

The object of the second embodiment is to reduce a motion blur by calculating a motion blur component in a vicinity of an increased intensity region for each image signal and adding a correction signal to current fields of a red image signal and a green image signal that have long persistence times. Simultaneously, color shift can be reduced by reducing the motion blur.

Third Embodiment

An image display apparatus according to the third embodiment of the present invention will be described with reference to FIGS. 10 and 11.

An object of the third embodiment is to reduce a motion blur by calculating a motion blur component in a vicinity of a reduced intensity region for each image signal and subtracting a correction signal from current fields of a red image signal and a green image signal. Furthermore, another object of the third embodiment is to reduce color shift simultaneously by reducing the motion blur.

Figure 10:
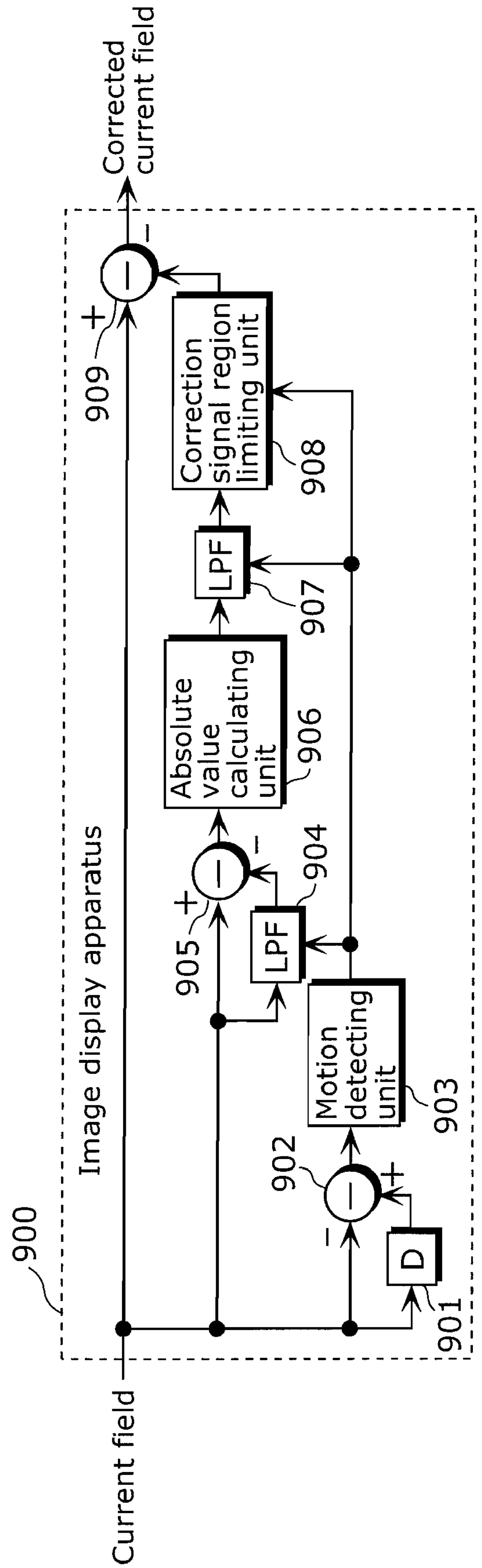
FIG. 10 illustrates a block diagram of the configuration of the image display apparatus according to the third embodiment.

FIG. 10 illustrates a block diagram of a detailed configuration of the image display apparatus according to the third embodiment. An image display apparatus 900 of the third embodiment includes a one-field delay device 901, subtractors 902, 905, and 909, a motion detecting unit 903, low-pass filters 904 and 907, an absolute value calculating unit 906, and a correction signal region limiting unit 908 as illustrated in FIG. 10. Here, each of the constituent elements of the image display apparatus 900 does input and output per horizontal line of red, green, and blue image signals.

The one-field delay device 901 delays an inputted current field by one field period, and outputs a previous field that is one field prior to the current field. The subtractor 902 subtracts the current field from the previous field, and outputs a subtraction signal including only positive components. The motion detecting unit 903 determines a width of a motion region that exceeds a threshold in the inputted subtraction signal, and outputs the width as a velocity of the motion. The LPF 904 applies an LPF to the inputted current field to output the resulting signal. The subtractor 905 subtracts an LPF-passing subtraction signal of a current field from the current field. The absolute value calculating unit 906 calculates an absolute value between the current field and the LPF-passing subtraction signal of the current field. The LPF 907 applies an LPF to an absolute value signal outputted from the absolute value calculating unit 906 to output the resulting signal. The correction signal region limiting unit 908 limits a correction signal value in a region other than the peripheral motion region to 0. The subtractor 909 subtracts, from the current field, the correction signal outputted from the correction signal region limiting unit 908.

Figure 11:
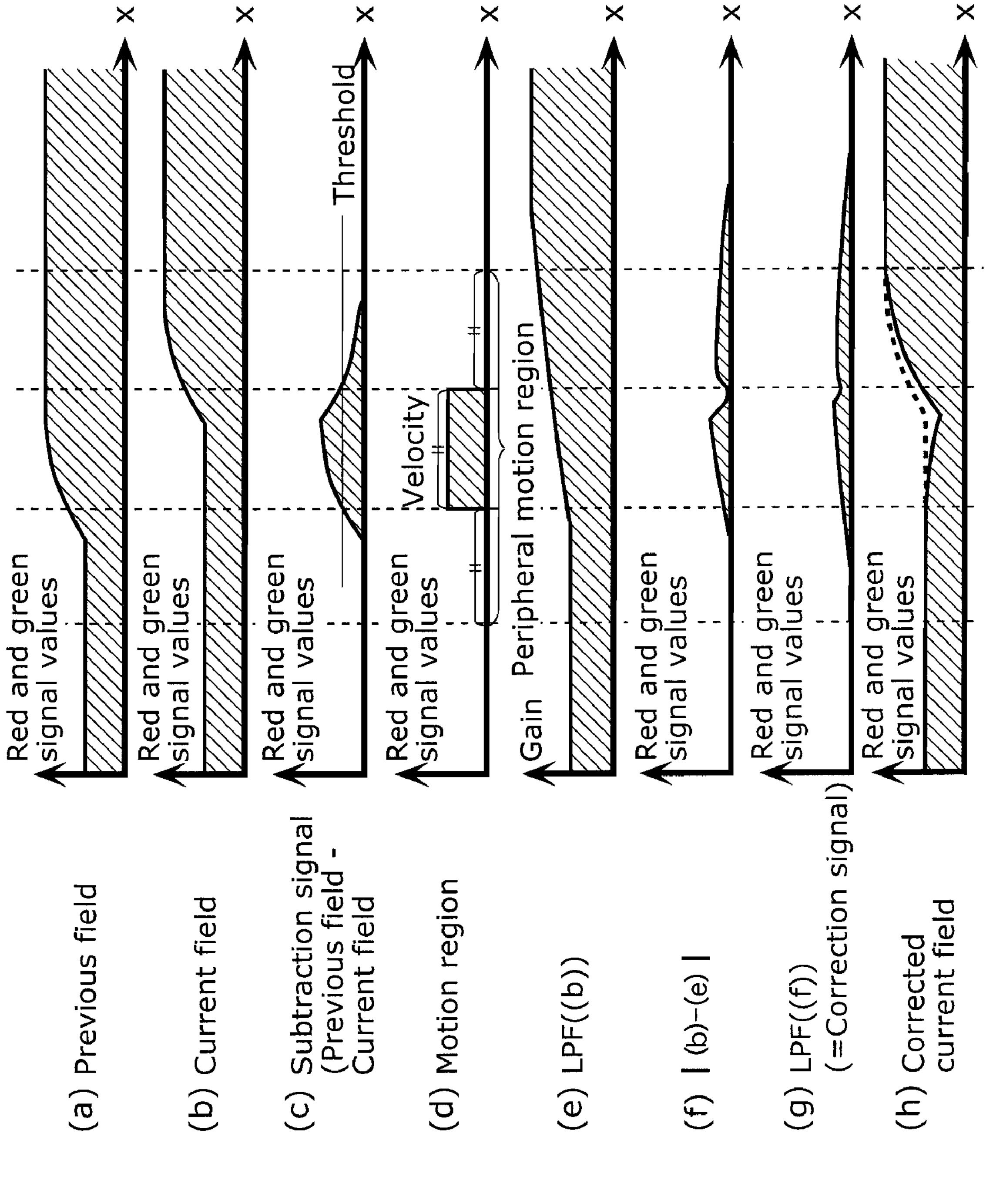
FIG. 11 shows a flow of processing in the image display apparatus according to the third embodiment, and respectively shows: (a) a previous field; (b) a current field; (c) a subtraction signal (previous field-current field); (d) a motion region; (e) an LPF-passing signal in a current field; (f) an absolute value signal of a subtraction signal obtained by subtracting the LPF-passing signal from the current field; (g) an LPF-passing signal of an absolute value signal; and (h) a corrected current field.

(a) to (h) in FIG. 11 explanatorily show a flow of processing in the image display apparatus according to the third embodiment. (a) to (h) in FIG. 11 show each signal for generating a correction signal for the red or green image signal per horizontal line, and changes in each of the signals. The following describes processing in the third embodiment in details.

The image display apparatus 900 of the third embodiment receives a horizontal line of a current field, and outputs the horizontal line in which a motion blur has been corrected.

First, a previous field is calculated. The one-field delay device 901 delays an inputted current field by one field period, and outputs a previous field that is one field prior to the current field. (a) in FIG. 11 shows the previous field, and (b) in FIG. 11 shows the current field.

Second, a subtraction signal is calculated using the previous field and the current field. The subtractor 902 subtracts the current field from the previous field, and outputs a subtraction signal including only positive components. (c) in FIG. 11 shows this subtraction signal.

Third, a motion region is detected from the subtraction signal. The motion detecting unit 903 determines a width of a motion region that exceeds a threshold in the inputted subtraction signal, and outputs the width as a velocity of the motion. (d) in FIG. 11 shows the motion region. Thereby, a reduced intensity region may be defined as the motion region. Furthermore, since motion search, for example, two-dimensional block matching is not performed, a motion region and a velocity can be detected with a reduced circuit scale.

Furthermore, as shown in (d) of FIG. 11, a region including a motion region, a region in the left vicinity of the motion region, and a region in the right vicinity of the motion region is referred to as a peripheral motion region to be used by the correction signal region limiting unit 908. The left vicinity of the motion region, the right vicinity of the motion region, and the motion region have an identical width.

Fourth, an LPF is applied to a current field. The LPF 904 applies the LPF to the inputted current field to output the resulting signal. Although the LPF calculates an average of pixels and the number of taps represents a velocity outputted from the motion detecting unit 903 in this embodiment, the calculation and the definition of the number of taps may not be limited to these. (e) of FIG. 11 shows an LPF-passing subtraction signal in a current field.

Fifth, the LPF-passing subtraction signal is subtracted from the current field. The subtractor 905 subtracts the LPF-passing subtraction signal from the current field.

Sixth, an absolute value between a current field and the LPF-passing subtraction signal is calculated. The absolute value calculating unit 906 calculates an absolute value between the current field and the LPF-passing subtraction signal. (f) of FIG. 11 shows an absolute value signal between the current field and the LPF-passing subtraction signal.

Seventh, an LPF is applied to the absolute value signal outputted from the absolute value calculating unit 906. The LPF 907 applies the LPF to the absolute value signal outputted from the absolute value calculating unit 906 to output the resulting signal. Although the LPF calculates an average of pixels and the number of taps represents a velocity outputted from the motion detecting unit 903 in this embodiment, the calculation and the definition of the number of taps may not be limited to these. (g) of FIG. 11 shows an LPF-passing signal of an absolute value signal. This is used as a correction signal.

Eighth, the use of the correction signal is limited to a peripheral motion region. The correction signal region limiting unit 908 limits a correction signal value in a region other than the peripheral motion region to 0. An end of the peripheral motion region may be blurred using an LPF and other means so as to prevent a correction signal becomes discontinuous. Thereby, only a region where a motion blur is noticeable and intensity of light is greatly reduced can be corrected.

Ninth, the correction signal is subtracted from a current field. The subtractor 909 subtracts, from a current field, a correction signal outputted from the correction signal region limiting unit 908. (h) in FIG. 11 shows the corrected current field.

The object of the third embodiment is to reduce a motion blur by calculating a motion blur component in a vicinity of a reduced intensity region for each image signal without using a motion direction, and subtracting a correction signal from current fields of a red image signal and a green image signal. Simultaneously, color shift can be reduced by reducing the motion blur.

Fourth Embodiment

Figure 12:
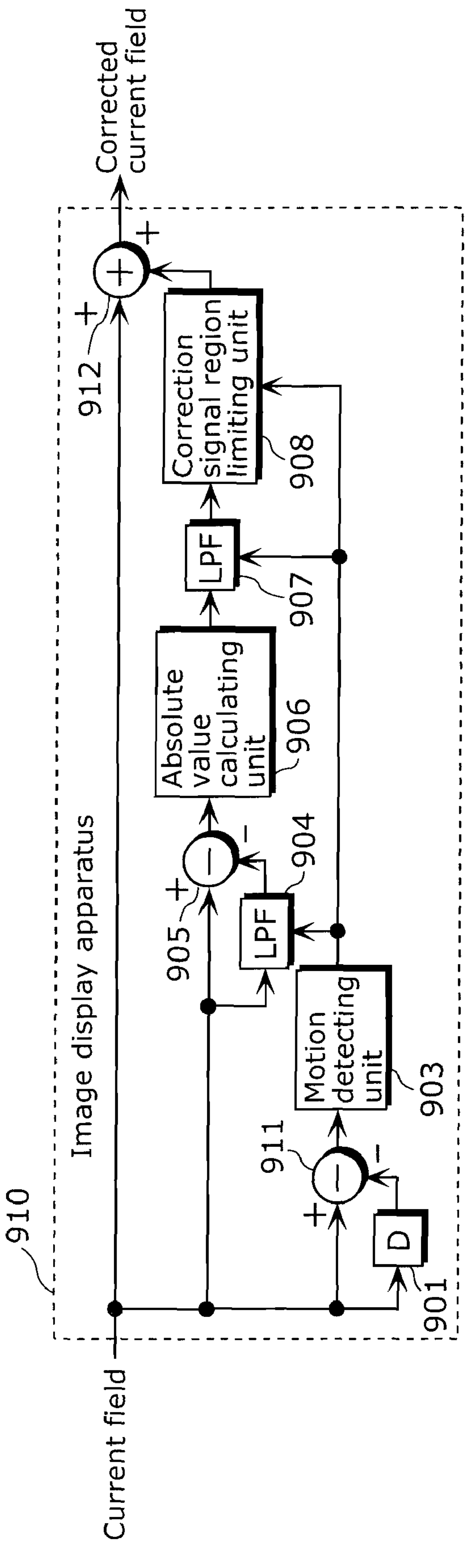
FIG. 12 illustrates a block diagram of the configuration of the image display apparatus according to the fourth embodiment.

FIG. 12 illustrates a block diagram of a detailed configuration of an image display apparatus according to the fourth embodiment.

The image display apparatus according to the fourth embodiment is partially changed from that of the third embodiment. The differences will only be described hereinafter.

An object of the fourth embodiment is to reduce a motion blur by calculating a motion blur component in a vicinity of an increased intensity region for each image signal and adding a correction signal to current fields of a red image signal and a green image signal that have long persistence times. Furthermore, another object of the fourth embodiment is to reduce color shift simultaneously by reducing the motion blur.

The differences of the configuration with the third embodiment will be described with reference to FIGS. 10 and 12. In the fourth embodiment, the subtractor 902 is changed to a subtractor 911, and the subtractor 909 is changed to an adder 912. The following describes the details.

The change from the subtractor 902 to the subtractor 911 will be described. Terms of subtraction are replaced with each other. In other words, the subtractor 911 subtracts a previous field from a current field, and outputs a subtraction signal including only positive components. Thereby, an increased intensity region may be defined as a motion region by inputting this subtraction signal to the motion detecting unit 903.

The change from the subtractor 909 will be described. The subtractor 909 is changed to the adder 912. Thereby, a correction signal can be added to an increased intensity region where persistence is insufficient. Thus, a blur caused by the persistence can be reduced and color shift can also be reduced.

The object of the fourth embodiment is to reduce a motion blur by calculating a motion blur component in a vicinity of an increased intensity region for each image signal and adding a correction signal to current fields of a red image signal and a green image signal that have long persistence times. Simultaneously, color shift can be reduced by reducing the motion blur.

In the first to fourth embodiments, the motion detecting unit, an asymmetric gain, and an LPF may be extended two-dimensionally to perform two-dimensional correction.

There are cases where red and green image signals may have values beyond a variable range, and correction may be insufficient after the final correction, namely, subtraction or addition (the processing is performed in the correcting unit 4 in FIG. 4 as the base configuration). In other words, there are cases where a motion blur cannot be removed completely. In the case of 8 bits, there are cases where an image signal that has been corrected may have a negative value or a value equal to or more than 255.

The red and green image signals may be simply clipped to a value in a range from 0 to 255. In other words, a negative value of the image signal may be replaced with 0, and a value equal to or larger than 255 of the image signal may be replaced with 255 for the output.

Furthermore, without such clipping, color shift may be improved by adding an absolute value representing a correction-deficient component (of one of a red signal and a green signal that has a larger absolute value) to a blue image signal having no motion blur, and by subtracting the absolute value from the blue image signal in a vicinity of a reduced intensity region.

Since correction on a portion where no color shift occurs is not necessary, occurrence of color shift is a precondition of the aforementioned case.

Thus, in the first to the fourth embodiments, a correction signal is calculated even for a blue image signal to limit the correction, thus preventing correction beyond the value of the calculated correction signal from being performed on the blue image signal. Thereby, only when color shift occurs, this function can be used. Furthermore, a reduced intensity region is corrected in the first and third embodiments, and an increased intensity region is corrected in the second and fourth embodiments. These two correction methods may be combined with each other.

Furthermore, although red and green image signals are corrected in the first to fourth embodiments, a signal to be corrected is not limited to these signals. As described in Patent Reference 1, for example, a blue image signal may be corrected. However, in this case, the motion blur cannot be improved but color shift can be improved. Furthermore, in this case, a blue signal can be corrected more precisely than the correction in Patent Reference 1 by using a motion direction.

Hereinafter described are a case where a reduced intensity region may be corrected with respect to a blue image signal using a motion direction, and a case where an increased intensity region may be corrected with respect to a blue image signal using a motion direction. The partial changes from the first embodiment are embodied using the image display apparatus having a case where a reduced intensity region may be corrected with respect to a blue image signal using a motion direction. The changes will only be described hereinafter.

An object of this image display apparatus is to reduce a motion blur by calculating a motion blur component in a vicinity of a reduced intensity region for each image signal and adding a correction signal to a current field of a blue image signal having a short persistence time.

The differences of the configuration with the first embodiment will be described with reference to FIG. 6.

In this case, the LPF 604, the asymmetric gain calculating unit 605, and the subtractor 608 are changed. The following describes the details.

The LPF 604 is not used. This is because processing for spatially amplifying a subtraction signal is not necessary when a blue image signal is used for the correction. For such correction, a motion region has only to be corrected as a region 412 in FIG. 3.

The change from the asymmetric gain calculating unit 605 will be described. An asymmetric gain has a geometry that can be corrected, for example, as the region 412 in FIG. 3. When a vicinity of a reduced intensity region is corrected using a blue image signal, a correction signal needs to have a geometry like the region 412 in FIG. 3. The geometry is different from a correction signal geometry 410 for use in correction by red and green image signals. Thus, an asymmetric gain having a geometry different from the correction signal geometry 410 needs to be used.

The subtractor 608 is changed to an adder. This is because a blue correction signal is added.

In this case, a motion blur can be reduced by calculating a motion blur component in a vicinity of a reduced intensity region for each image signal and adding a correction signal to a current field of a blue image signal having a short persistence time.

Next, the partial changes from the first embodiment are embodied using the image display apparatus having a case where an increased intensity region may be corrected with respect to a blue image signal using a motion direction. The changes will only be described hereinafter.

The object of this image display apparatus is to reduce a motion blur by calculating a motion blur component in a vicinity of an increase intensity region for each image signal and adding a correction signal to a current field of a blue image signal having a short persistence time.

The differences of the configuration with the first embodiment will be described with reference to FIG. 6. In this case, the subtractor 602, the motion detecting unit 603, the LPF 604, and the asymmetric gain calculating unit 605 are changed. The following describes the details.

The subtractor 602 and the motion detecting unit 603 are changed in the same manner as those of the second embodiment.

The LPF 604 is not used. This is because processing for spatially amplifying a subtraction signal is not necessary when a blue image signal is used for the correction. For such correction, a motion region has only to be corrected as the region 413 in FIG. 3.

The change from the asymmetric gain calculating unit 605 will be described. An asymmetric gain has a geometry that can be corrected, for example, as the region 413 in FIG. 3. When the vicinity of a reduced intensity region is corrected using a blue image signal, a correction signal needs to have a geometry like the region 413 in FIG. 3. The geometry is different from a correction signal geometry 411 for use in correction by red and green image signals. Thus, an asymmetric gain having a geometry different from the correction signal geometry 411 needs to be used.

In this case, a motion blur can be reduced by calculating a motion blur component in a vicinity of an increased intensity region for each image signal and subtracting a correction signal from a current field of a blue image signal having a short persistence time.

(Other Variations)

Although the present invention is described according to the aforementioned embodiments and the variations, the present invention is not limited to such embodiments. The present invention includes the following cases.

(1) Each of the above apparatuses is specifically a computer system including a micro processing unit, a ROM, a RAM, and the like. The computer program is stored in the RAM. The micro processing unit operates according to the computer program, so that each of the apparatuses fulfills a function. Here, in order to fulfill predetermined functions, the computer program is programmed by combining plural instruction codes each of which indicates an instruction for a computer.

(2) Part or all of the components included in each of the above apparatuses may be included in one system large scale integration (LSI). The system LSI is a super-multifunctional LSI manufactured by integrating components on one chip and is, specifically, a computer system including a micro processing unit, a ROM, a RAM, and the like. The computer program is stored in the RAM. The micro processing unit operates according to the computer program, so that the system LSI fulfills its function.

(3) Part or all of the components included in each of the above apparatuses may be included in an IC card removable from each of the apparatuses or in a stand alone module. The IC card or the module is a computer system including a micro processing unit, a ROM, a RAM, and the like. The IC card or the module may include the above super-multifunctional LSI. The micro processing unit operates according to the computer program, so that the IC card or the module fulfills its function. The IC card or the module may have tamper-resistance.

(4) The present invention may be any of the above methods. Furthermore, the present invention may be a computer program which causes a computer to execute these methods, and a digital signal which is composed of the computer program. Moreover, in the present invention, the computer program or the digital signal may be recorded on a computer-readable recording medium such as a flexible disk, a hard disk, a CD-ROM, an MO, a DVD, a DVD-ROM, a DVD-RAM, a Blu-ray Disc (BD), and a semiconductor memory.

In addition, the digital signal may be recorded on these recording media.

Furthermore, in the present invention, the computer program or the digital signal may be transmitted via an electronic communication line, a wireless or wired communication line, a network represented by the Internet, data broadcasting, and the like.

Moreover, the present invention may be a computer system including a micro processing unit and a memory. The memory may store the above computer program, and the micro processing unit may operate according to the computer program.

Furthermore, the present invention may execute the computer program or the digital signal in another independent computer system by recording the computer program or the digital signal on the recording medium and transmitting the recorded computer program or digital signal or by transmitting the computer program or the digital signal via the network and the like.

Furthermore, the present invention may be any of the above methods.

Furthermore, the above embodiments and the above variations may be combined respectively.

INDUSTRIAL APPLICABILITY

The image display apparatus and the image displaying method according to the present invention can reduce, in an image, a motion blur occurring due to a persistence component in a phosphor. Accordingly, the color shift can be improved. For example, the present invention is applicable to an image display apparatus using phosphors each having a persistence time, such as a plasma display panel.

The invention claimed is:

1. An image display apparatus that displays an image using a plurality of phosphors, each phosphor of the plurality of phosphors having a persistence time, said image display apparatus comprising:

a motion detecting unit configured to detect motion information from an inputted image signal;

a correction signal calculating unit configured to calculate a correction signal for removing a motion blur using the detected motion information, the motion blur being caused by persistence and a motion of the image signal; and a correcting unit configured to correct the image signal using the calculated correction signal, wherein said correction signal calculating unit is configured to calculate, using the detected motion information, the correction signal so as to attenuate the image signal in a region where a value of the image signal is smaller than a value of a previous field of the image signal.

2. The image display apparatus according to claim 1, wherein said correction signal calculating unit is configured to calculate, using the detected motion information, the correction signal so as to attenuate the image signal (i) in the region where the value of the image signal is smaller than the value of the previous field of the image signal and (ii) in a vicinity of the region.

3. The image display apparatus according to claim 2, wherein said motion detecting unit is configured to detect a motion region of the image signal as the motion information, and wherein said correction signal calculating unit is configured to calculate the correction signal so as to attenuate the image signal (i) in the region where the value of the image signal is smaller than the value of the previous field of the image signal and (ii) in the vicinity of the region, the region being included in the detected motion region and included in a vicinity of the detected motion region.

4. The image display apparatus according to claim 1, wherein said motion detecting unit is further configured to calculate a velocity of a motion in a detected motion region, and wherein said correction signal calculating unit is configured to correct an amount of change between a value of the image signal in a current field and a value of the image signal in a previous field, in the detected motion region and in a vicinity of the detected motion region according to the calculated velocity of the motion, and to calculate the corrected amount of change as the correction signal.

5. The image display apparatus according to claim 4, wherein said correction signal calculating unit is configured to correct the amount of change by performing low-pass filter processing with a number of taps associated with the calculated velocity of the motion.

6. The image display apparatus according to claim 4, wherein said motion detecting unit is further configured to calculate a motion direction of the detected motion region, and wherein said correction signal calculating unit is configured to asymmetrically correct the amount of change according to the calculated velocity of the motion and the calculated motion direction, and to calculate the asymmetrically corrected amount of change as the correction signal.

7. The image display apparatus according to claim 6, wherein said correction signal calculating unit is configured to correct the amount of change by (i) performing low-pass filter processing with a number of taps associated with the calculated velocity of the motion, and (ii) multiplying a low-pass filter passing signal, onto which the low-pass filter processing has been performed, by an asymmetrical signal generated using two straight lines and a quadratic function according to the calculated motion direction.

8. The image display apparatus according to claim 1, wherein said motion detecting unit is further configured to calculate the motion information regarding a detected motion region and to calculate motion information reliability indicating a reliability of the detected motion information, and wherein said correction signal calculating unit is configured to attenuate the correction signal as the calculated motion information reliability is lower.

9. The image display apparatus according to claim 8, wherein said motion detecting unit is configured to calculate a velocity of a motion in the detected motion region as the motion information, and to calculate the motion information reliability so that the motion information reliability becomes lower in inverse proportion to the detected velocity of the motion.

10. The image display apparatus according to claim 8, wherein said motion detecting unit is configured to calculate, as the detected motion information, a difference in a corresponding region between a current field and a previous field, and to calculate the motion information reliability so that the motion information reliability becomes lower in inverse proportion to the calculated difference.

11. The image display apparatus according to claim 8, wherein said motion detecting unit is configured to calculate, as the detected motion information, a difference in a corresponding region between a current field and a previous field and a difference of a vicinity of the corresponding region between the current field and the previous field, and to calculate the motion information reliability so that the motion information reliability becomes lower in inverse proportion to a difference between the calculated differences.

12. The image display apparatus according to claim 8, wherein said motion detecting unit is configured to calculate, as the detected motion information, a velocity and a motion direction of a motion in the detected motion region, and to calculate the motion information reliability so that the motion information reliability becomes lower in inverse proportion to a difference between (i) the velocity and the motion direction of the motion and (ii) a velocity and a motion direction of a motion in a vicinity of the detected motion region.

13. The image display apparatus according to claim 8, wherein said motion detecting unit is configured to calculate, as the detected motion information, a velocity and a motion direction of a motion in the motion region, and to calculate the motion information reliability so that the motion information reliability becomes lower in inverse proportion to a difference between (i) the velocity and the motion direction of the motion and (ii) a velocity and a motion direction of a motion in a corresponding region of the previous field.

14. An image displaying method for displaying an image using a plurality of phosphors, each phosphor of the plurality of phosphors having a persistence time, said image display method comprising:

detecting motion information from an inputted image signal;

calculating a correction signal for removing a motion blur using the detected motion information, the motion blur being caused by persistence and a motion of the image signal; and correcting the image signal using the calculated correction signal, wherein in said calculating, the correction signal is calculated using the detected motion information so as to attenuate the image signal in a region where a value of the image signal is smaller than a value of a previous field of the image signal.

15. An integrated circuit for displaying an image using a plurality of phosphors, each phosphor of the plurality of phosphors having a persistence time, said integrated circuit comprising:

a motion detecting unit configured to detect motion information from an inputted image signal;

a correction signal calculating unit configured to calculate a correction signal for removing a motion blur using the detected motion information, the motion blur being caused by persistence and a motion of the image signal; and a correcting unit configured to correct the image signal using the calculated correction signal, wherein said correction signal calculating unit is configured to calculate, using the detected motion information, the correction signal so as to attenuate the image signal in a region where a value of the image signal is smaller than a value of a previous field of the image signal.

* * * * *